(12) United States Patent
Kondo et al.

(10) Patent No.: US 9,167,191 B2
(45) Date of Patent: Oct. 20, 2015

(54) DISPLAY CONTROL SYSTEM AND METHOD, DISPLAY CONTROL APPARATUS AND METHOD, AND PROGRAM

(75) Inventors: Tetsujiro Kondo, Tokyo (JP); Tsuyoshi Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 1963 days.

(21) Appl. No.: 11/854,774

(22) Filed: Sep. 13, 2007

(65) Prior Publication Data

US 2008/0068285 A1    Mar. 20, 2008

(30) Foreign Application Priority Data

Sep. 15, 2006 (JP) ................................. 2006-250428

(51) Int. Cl.
| | |
|---|---|
| G09G 5/00 | (2006.01) |
| H04N 5/445 | (2011.01) |
| H04N 21/41 | (2011.01) |
| H04N 21/433 | (2011.01) |
| H04N 21/442 | (2011.01) |
| G06F 3/14 | (2006.01) |
| H04N 21/422 | (2011.01) |

(52) U.S. Cl.
CPC ....... *H04N 5/44591* (2013.01); *H04N 5/44582* (2013.01); *H04N 21/4122* (2013.01); *H04N 21/42222* (2013.01); *H04N 21/4334* (2013.01); *H04N 21/44218* (2013.01); *G06F 3/1446* (2013.01); *H04N 21/4221* (2013.01)

(58) Field of Classification Search
CPC ............. G06F 3/1446; H04N 5/44591; H04N 5/44582
USPC .............................................. 345/1.1–3.4, 7, 8
See application file for complete search history.

(56) References Cited

U.S. PATENT DOCUMENTS

| | | | |
|---|---|---|---|
| 2004/0090391 A1 | 5/2004 | Kondo | |
| 2005/0225652 A1* | 10/2005 | Kudo | ........................ 348/231.99 |
| 2006/0109238 A1* | 5/2006 | Lau et al. | ........................ 345/156 |
| 2006/0209191 A1* | 9/2006 | Tsukui | ..................... 348/207.99 |

FOREIGN PATENT DOCUMENTS

| | | |
|---|---|---|
| JP | 2000-231427 | 8/2000 |
| JP | 2004-064409 | 2/2004 |
| JP | 2004-070130 | 3/2004 |
| JP | 2004-213486 | 7/2004 |
| JP | 2004-289866 | 10/2004 |

OTHER PUBLICATIONS

Japanese Office Action mailed Mar. 22, 2012 in Japanese Patent Application No. 2006-250428 filed Sep. 15, 2006.

* cited by examiner

*Primary Examiner* — Dennis Joseph
(74) *Attorney, Agent, or Firm* — Oblon, McClelland, Maier & Neustadt, L.L.P.

(57) ABSTRACT

A display control system for controlling display of images on a plurality of display units, the plurality of display units being arranged in an array, includes a determining unit determining whether or not information of interest is being displayed; a first recording control unit controlling recording of a first image displayed on the display units when the determining unit determines that the information of interest is being displayed; a second recording control unit controlling recording of a second image displayed on the display units when a user performs a recording operation; and a display control unit controlling display of the first image or the second image on the display units.

16 Claims, 32 Drawing Sheets

DISPLAY CONTROL SYSTEM AND METHOD, DISPLAY CONTROL APPARATUS AND METHOD, AND PROGRAM

CROSS REFERENCES TO RELATED APPLICATIONS

The present invention contains subject matter related to Japanese Patent Application JP 2006-250428 filed in the Japanese Patent Office on Sep. 15, 2006, the entire contents of which are incorporated herein by reference.

BACKGROUND OF THE INVENTION

1. Field of the Invention

The present invention relates to display control systems and methods, display control apparatuses and methods, and programs. More specifically, the present invention relates to a display control system and method, a display control apparatus and method, and a program for allowing a user to easily record information of interest displayed on any of a plurality of displays and to display the recorded information.

2. Description of the Related Art

Recently, multi-display technology has become available. The multi-display technology allows different images to be displayed on multiple display devices of a multi-display apparatus arranged vertically or horizontally in the same orientation. Further, such multiple display devices can be used in combination to display a single image in an enlarged scale, or a divided image can be displayed with a desired size (see Japanese Unexamined Patent Application Publication No. 2004-289866).

Such a multi-display apparatus provides a "zapping" function once users move their line of sight while viewing programs. Users can browse through many programs by moving their line of sight, and can therefore easily find information of interest.

Japanese Unexamined Patent Application Publication No. 2004-213486 discloses an image processing apparatus for controlling a process for detecting a user's line of sight and selecting an image corresponding to the detected line of sight from among a plurality of images displayed on display means.

In general, display devices have a "memo" function. Users press a memo button provided on a remote controller or the like when information of interest is displayed on the display devices, thereby storing the information in a memory. In particular, display devices further having a zoom display function allow any small and illegible part of an image to be stored using the memo function so that the stored part can be enlarged and displayed later using the zoom display function. Therefore, the memo function may be highly demanded.

SUMMARY OF THE INVENTION

However, multi-display apparatuses have a problem. As described above, the zapping function is provided once users move their line of sight. Therefore, as shown in FIG. 1, users may find information of interest at the moment when they move the line of sight.

FIG. 1 shows an example in which an image is displayed on display devices constituting a multi-display apparatus. The multi-display apparatus shown in FIG. 1 includes nine display devices 1-1 to 1-9, and display screens of the display devices 1-1 to 1-9 are arranged in an array. In the example shown in FIG. 1, for the convenience of illustration, only the display device 1-3 displays an image; however, the other display devices 1-1, 1-2, and 1-4 to 1-9 also display images of different programs.

For example, a user A moves his/her line of sight from the image displayed on the display device 1-2 to the image displayed on the display device 1-3, and finds information of interest in the image displayed on the display device 1-3. In the example shown in FIG. 1, a pitcher during a game of baseball appears on the display device 1-3, and the user A is interested in the pitcher's grip on the ball.

The user A desires to operate a remote controller 2 to use the memo function. However, due to the time-consuming operation of the remote controller 2 or the delayed reaction of the user A, the user A may not be able to use the memo function at the desired time and may fail to catch the desired information. For example, in the multi-display apparatus, the memo function is not available until the user A has selected which display device displaying an image of which the user A desires to make a memo, or the user A may hesitate to press the memo button on the remote controller 2.

To address this problem, it is conceivable to constantly record images of the last several frames in a hard disk or the like. However, it is time-consuming to operate the hard disk to search for desired information, and a large number of images are constantly recorded, resulting in an increase in the processing load. Further, the cost of a hard disk used for video recording is greater than the cost of a memory used for the memo function.

It is therefore desirable to allow a user to easily record information of interest with no failure when the user finds the information on a multi-display apparatus having a plurality of display devices.

According to a first embodiment of the present invention, there is provided a display control system for controlling display of images on a plurality of display means, the plurality of display means being arranged in an array. The display control system includes determining means for determining whether or not information of interest is being displayed; first recording control means for controlling recording of a first image displayed on the display means when the determining means determines that the information of interest is being displayed; second recording control means for controlling recording of a second image displayed on the display means when a user performs a recording operation; and display control means for controlling display of the first image or the second image on the display means.

The display control system can further include a plurality of display control apparatuses each associated with each of the plurality of display means and controlling display of an image on the display means. Each of the plurality of display control apparatuses can include the determining means, the first recording control means, the second recording control means, and the display control means.

The display control system can further include the plurality of display means.

The display control system can further include a line-of-sight detection apparatus that detects a line of sight of the user, and the determining means of each of the plurality of display control apparatuses can determine whether or not the information of interest is being displayed on the display means on the basis of a detection result from the line-of-sight detection apparatus.

The first recording control means of each of the plurality of display control apparatuses can control the recording of the first image displayed on the display means when the determining means determines that the information of interest is being displayed on the display means on the basis of the detection result from the line-of-sight detection apparatus.

The display control system can further include a remote controller that controls the plurality of display control apparatuses, and the remote controller can include speech detecting means for detecting specific speech of the user. The determining means of each of the plurality of display control apparatuses can determine whether or not the information of interest is being displayed on one of the plurality of display means on the basis of a detection result from the speech detecting means.

The first recording control means of each of the plurality of display control apparatuses can control the recording of the first image displayed on the display means when the determining means determines that the information of interest is being displayed on one of the plurality of display means on the basis of the detection result from the speech detecting means.

The display control system can further include a remote controller that controls the plurality of display control apparatuses, and the remote controller can include acceleration detecting means for detecting an acceleration of the remote controller that is operated by the user. The determining means of each of the plurality of display control apparatuses can determine whether or not the information of interest is being displayed on one of the plurality of display means on the basis of a detection result from the acceleration detecting means.

The first recording control means of each of the plurality of display control apparatuses can control the recording of the first image displayed on the display means when the determining means determines that the information of interest is being displayed on one of the plurality of display means on the basis of the detection result from the acceleration detecting means.

The first recording control means of each of the plurality of display control apparatuses can control to start recording of a moving image, starting from the first image displayed on the display means, when the determining means determines that the information of interest is being displayed. The second recording control means can control to stop the recording of the moving image at the second image displayed on the display means when the user performs the recording operation. The display control means can control display of the moving image starting with the first image displayed on the display means and ending with the second image displayed on the display means.

According to the embodiment of the present invention, there is provided a display control method for a display control system for controlling display of images on a plurality of display means, the plurality of display means being arranged in an array. The display control method includes the steps of determining whether or not information of interest is being displayed; controlling recording of a first image displayed on the display means when it is determined that the information of interest is being displayed; controlling recording of a second image displayed on the display means when a user performs a recording operation; and controlling display of the first image or the second image on the display means.

According to a second embodiment of the present invention, there is provided a display control apparatus in a display control system including a plurality of display control apparatuses, for controlling display of an image on display means associated with the display control apparatus from among a plurality of display means arranged in an array. The display control apparatus includes determining means for determining whether or not information of interest is being displayed; first recording control means for controlling recording of a first image displayed on the display means when the determining means determines that the information of interest being displayed; second recording control means for controlling recording of a second image displayed on the display means when a user performs a recording operation; and display control means for controlling display of the first image or the second image on the display means.

According to the second embodiment of the present invention, there is provided a display control method for a display control apparatus in a display control system including a plurality of display control apparatuses, for controlling display of an image on display means associated with the display control apparatus from among a plurality of display means arranged in an array. The display control method includes the steps of determining whether or not information of interest is being displayed; controlling recording of a first image displayed on the display means associated with the display control apparatus when it is determined that the information of interest is being displayed; controlling recording of a second image displayed on the display means associated with the display control apparatus when a user performs a recording operation; and controlling display of the first image or the second image on the display means associated with the display control apparatus.

According to the second embodiment of the present invention, there is provided a program for allowing a display control apparatus in a display control system including a plurality of display control apparatuses to execute a process for controlling display of an image on display means associated with the display control apparatus from among a plurality of display means arranged in an array. The program includes the steps of determining whether or not information of interest is being displayed; controlling recording of a first image displayed on the display means associated with the display control apparatus when it is determined that the information of interest is being displayed; controlling recording of a second image displayed on the display means associated with the display control apparatus when a user performs a recording operation; and controlling display of the first image or the second image on the display means associated with the display control apparatus.

According to the first embodiment of the present invention, in a display control system for controlling display of images on a plurality of display means, the plurality of display means being arranged in an array, it is determined whether or not information of interest is being displayed, and the recording of a first image displayed on the display means is controlled when it is determined that the information of interest is being displayed. In accordance with a recording operation performed by a user, a second image displayed on the display means is controlled. The display of the first or second image on the display means is controlled.

According to the second embodiment of the present invention, it is determined whether or not information of interest is being displayed, and the recording of a first image displayed on the display means is controlled when it is determined that the information of interest is being displayed. In accordance with a recording operation performed by a user, the recording of a second image displayed on the display means is controlled. The display of the first or second image on the display means is controlled.

According to the first embodiment of the present invention, therefore, even in an environment where a plurality of display devices are arranged, a user can easily record information of interest with no failure when the user finds the information being displayed on any of the display devices.

According to the second embodiment of the present invention, therefore, even in an environment where a plurality of display devices are arranged, a user can avoid failure to catch information of interest with a small memory capacity when the user finds the information being displayed on any of the display devices.

DESCRIPTION OF THE PREFERRED EMBODIMENTS

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described herein as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Figure 9:
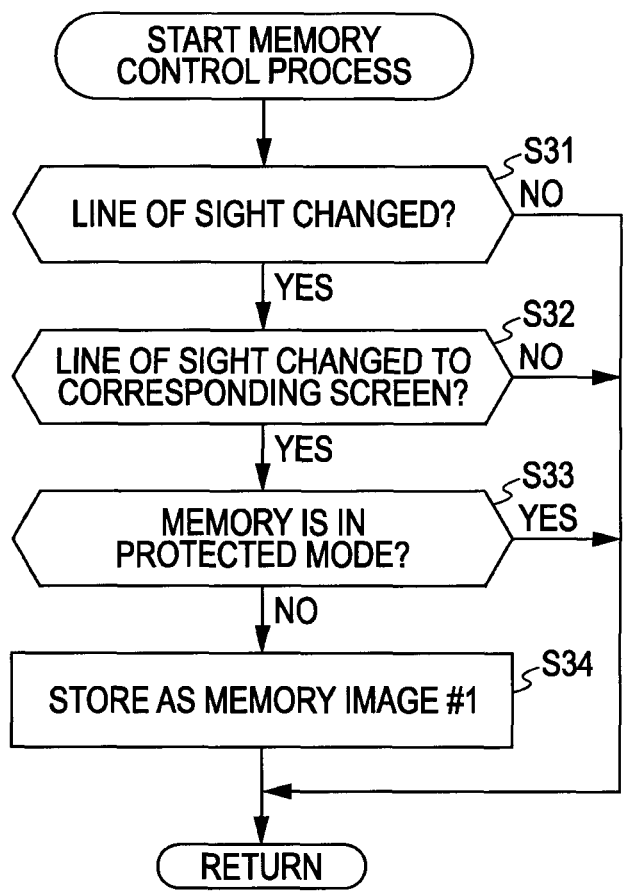
FIG. 9 is a flowchart showing a memory control process in step S13 shown in FIG. 8.
Figure 10:
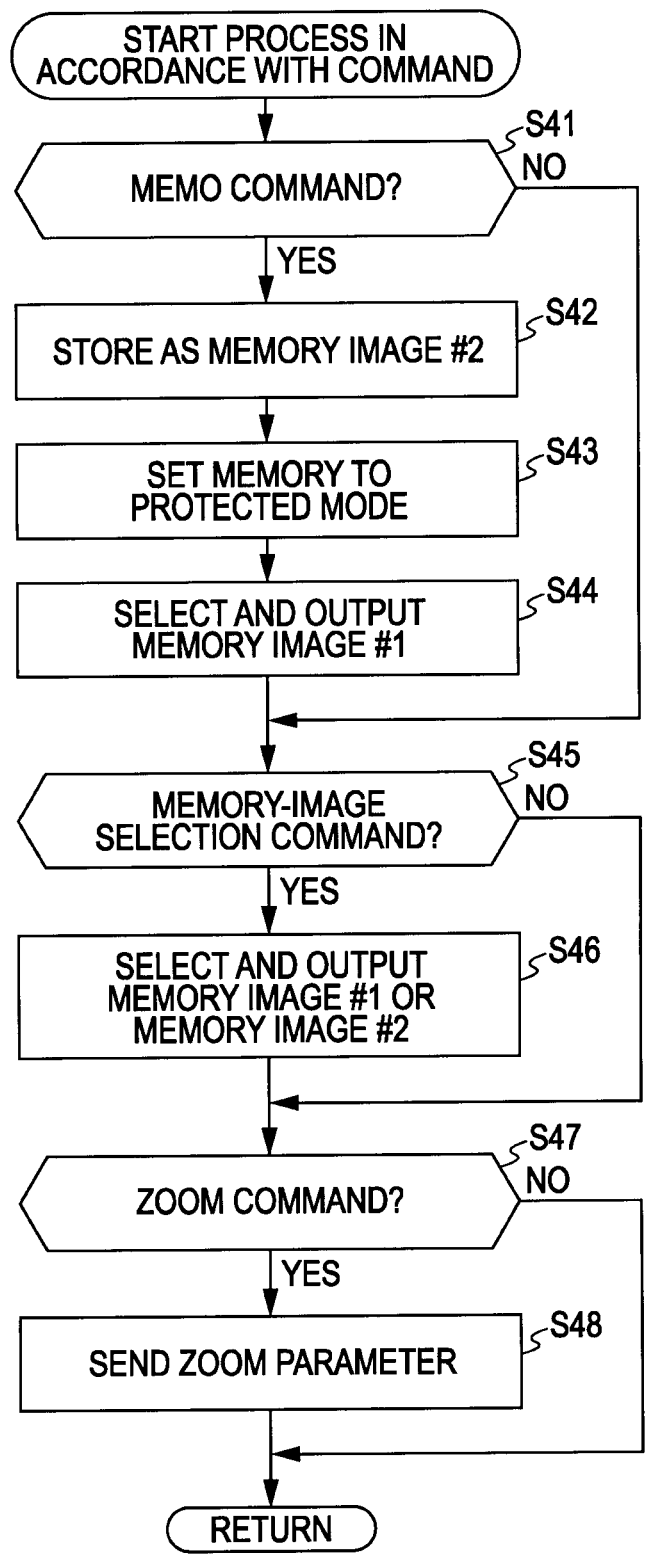
FIG. 10 is a flowchart showing a process in accordance with a command in step S19 shown in FIG. 8.

According to a first embodiment of the present invention, there is provided a display control system (e.g., a multi-display system shown in FIG. 2) for controlling display of images on a plurality of display means (e.g., a display 65 shown in FIG. 4), the plurality of display means being arranged in an array. The display control system includes determining means (e.g., a control unit 66 shown in FIG. 4 that performs the processing of step S31 shown in FIG. 9) for determining whether or not information of interest is being displayed; first recording control means (e.g., a control unit 66 shown in FIG. 4 that performs the processing of step S34 shown in FIG. 9) for controlling recording of a first image displayed on the display means when the determining means determines that the information of interest is being displayed; second recording control means (e.g., a control unit 66 shown in FIG. 4 that performs the processing of step S42 shown in FIG. 10) for controlling recording of a second image displayed on the display means when a user performs a recording operation; and display control means (e.g., an output selection unit 63 shown in FIG. 4) for controlling display of the first image or the second image on the display means.

The display control system can further include a plurality of display control apparatuses (e.g., display devices 31-1 to 31-9 shown in FIG. 2) each associated with each of the plurality of display means and controlling display of an image on the display means. Each of the plurality of display control apparatuses can include the determining means, the first recording control means, the second recording control means and the display control means.

The display control system can further include a line-of-sight detection apparatus (e.g., a line-of-sight detection apparatus 23 shown in FIG. 2) that detects a line of sight of the user, and the determining means of each of the plurality of display control apparatuses can determine whether or not the information of interest is being displayed on the display means on the basis of a detection result from the line-of-sight detection apparatus.

The display control system can further include a remote controller (e.g., a remote controller 112 shown in FIG. 20) that controls the plurality of display control apparatuses, and the remote controller can include speech detecting means (e.g., an event determination unit 152 shown in FIG. 29) for detecting specific speech of the user. The determining means of each of the plurality of display control apparatuses can determine whether or not the information of interest is being displayed on one of the plurality of display means on the basis of a detection result from the speech detecting means.

The display control system can further include a remote controller (e.g., a remote controller 112 shown in FIG. 20) that controls the plurality of display control apparatuses, and the remote controller can include acceleration detecting means (e.g., an event determination unit 123 shown in FIG. 22) for detecting an acceleration of the remote controller that is operated by the user. The determining means of each of the plurality of display control apparatuses can determine whether or not the information of interest is being displayed on one of the plurality of display means on the basis of a detection result from the acceleration detecting means.

According to the first embodiment of the present invention, there is provided a display control method for a display control system for controlling display of images on a plurality of display means, the plurality of display means being arranged in an array. The display control method includes the steps of determining (e.g., step S31 shown in FIG. 9) whether or not information of interest is being displayed; controlling (e.g., step S34 shown in FIG. 9) recording of a first image displayed on the display means when it is determined that the information of interest is being displayed; controlling (e.g., step S42 shown in FIG. 10) recording of a second image displayed on the display means when a user performs a recording operation; and controlling (e.g., step S44 shown in FIG. 10) display of the first image or the second image on the display means.

According to a second embodiment of the present invention, there is provided a display control apparatus (e.g., a display device 31-1 shown in FIG. 2) in a display control system (e.g., a multi-display system shown in FIG. 2) including a plurality of display control apparatuses (e.g., display devices 31-1 to 31-9 shown in FIG. 2), for controlling display of an image on display means (e.g., a display 65 shown in FIG. 4) associated with the display control apparatus from among a plurality of display means arranged in an array. The display control apparatus includes the display means for displaying an image corresponding to an image signal input to the display control apparatus; determining means (e.g., a control unit 66 shown in FIG. 4 that performs the processing of step S31 shown in FIG. 9) for determining whether or not information of interest is being displayed; first recording control means (e.g., a control unit 66 shown in FIG. 4 that performs the processing of step S34 shown in FIG. 9) for controlling recording of a first image displayed on the display means when the determining means determines that the information of interest being displayed; second recording control means (e.g., a control unit 66 shown in FIG. 4 that performs the processing of step S42 shown in FIG. 10) for controlling recording of a second image displayed on the display means when a user performs a recording operation; and display control means (e.g., an output selection unit 63 shown in FIG. 4) for controlling display of the first image or the second image on the display means.

According to the second embodiment of the present invention, there is provided a display control method or a program for a display control apparatus in a display control system including a plurality of display control apparatuses, for controlling display of an image on display means associated with the display control apparatus from among a plurality of display means arranged in an array. The display control method or the program includes the steps of determining (e.g., step S31 shown in FIG. 9) whether or not information of interest is being displayed; controlling (e.g., step S34 shown in FIG. 9) recording of a first image displayed on the display means associated with the display control apparatus when it is determined that the information of interest is being displayed; controlling (e.g., step S42 shown in FIG. 10) recording of a second image displayed on the display means associated with the display control apparatus when a user performs a recording operation; and controlling (e.g., step S44 shown in FIG. 10) display of the first image or the second image on the display means associated with the display control apparatus.

Embodiments of the present invention will be described hereinafter with reference to the drawings.

Figure 1:
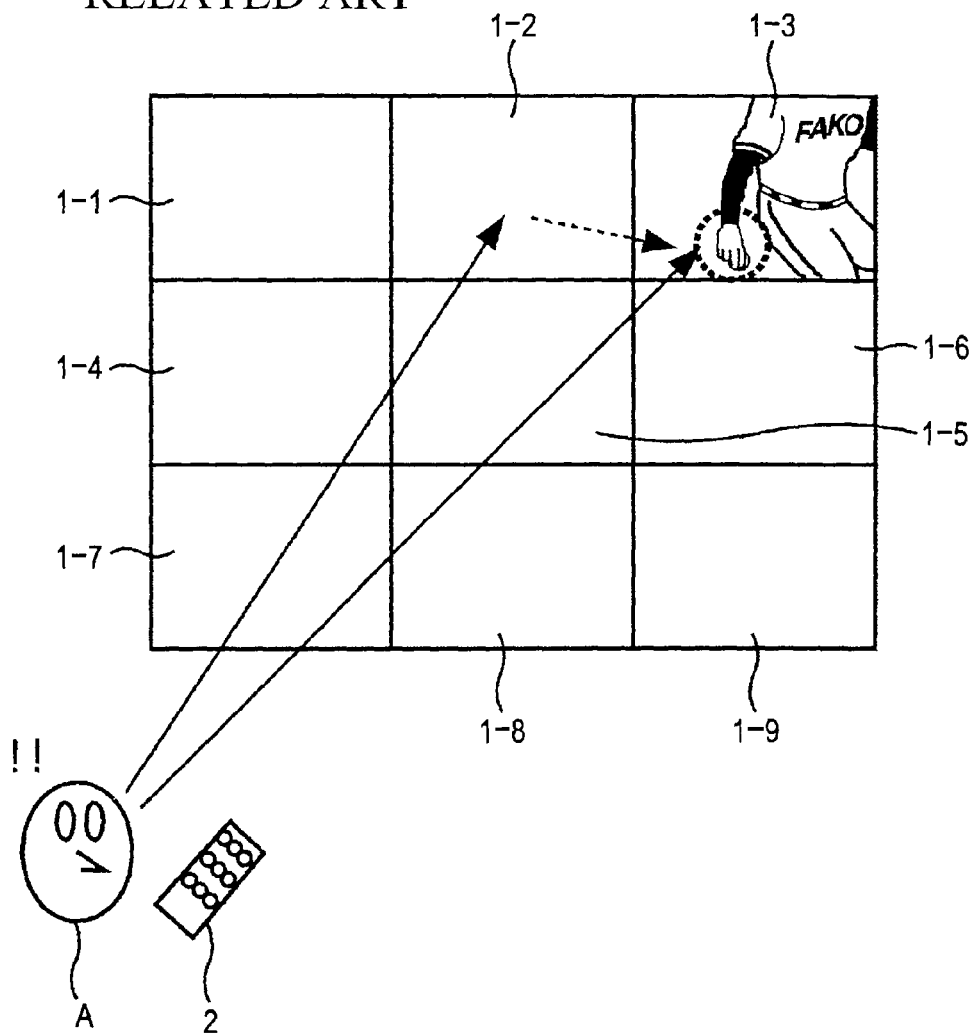
FIG. 1 is a diagram showing a memo function of a multi-display apparatus of the related art.
Figure 2:
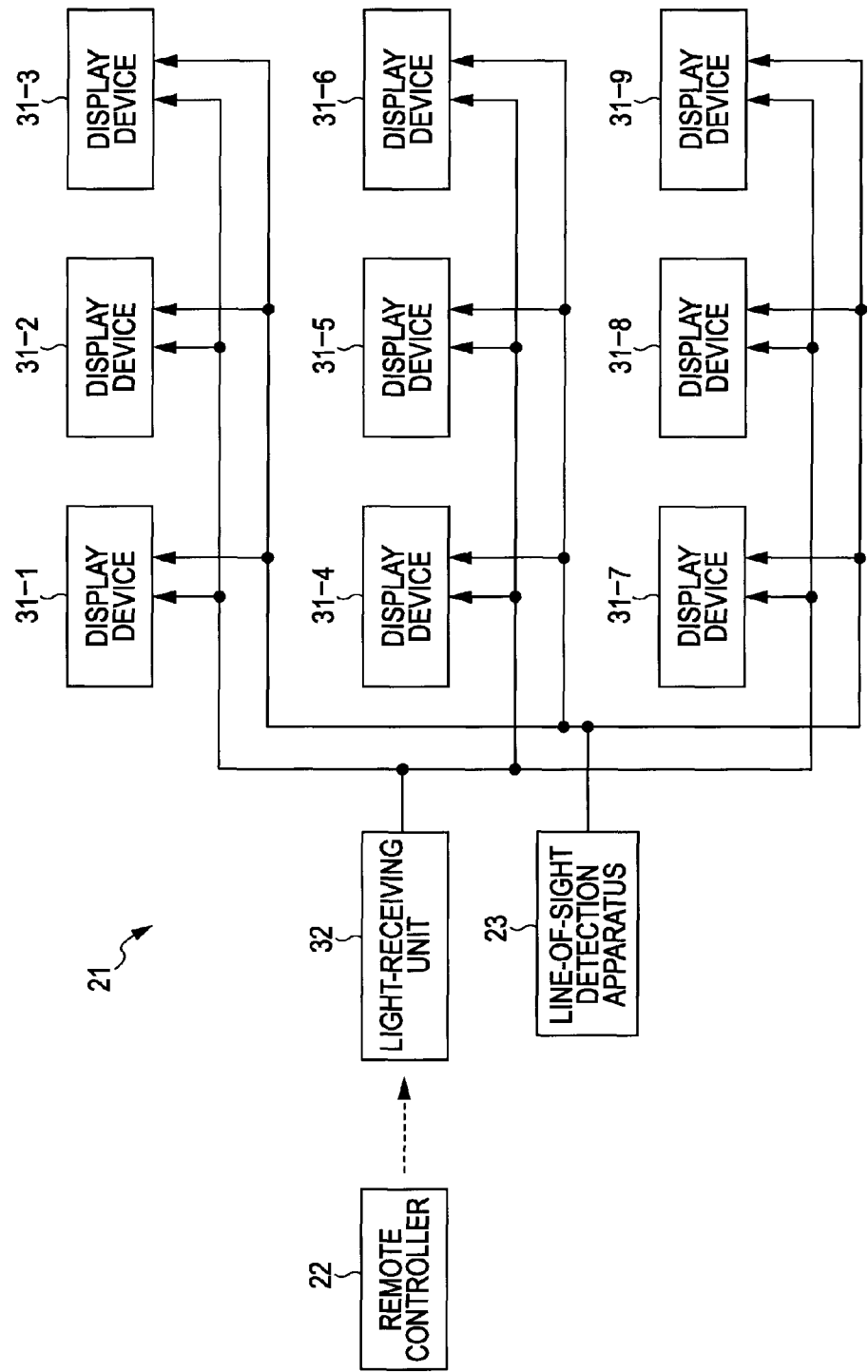
FIG. 2 is a block diagram showing an example of the structure of a multi-display system according to a first embodiment of the present invention.

FIG. 2 is a diagram showing an example of the structure of a multi-display system (the term system refers to a logical collection of a plurality of apparatuses, and the apparatuses may or may not be placed in a housing) according to a first embodiment of the present invention.

In FIG. 2, the multi-display system includes a multi-display apparatus 21 having a plurality of display devices 31-1 to 31-9, a remote controller 22, and a line-of-sight detection apparatus 23. In the multi-display system, the plurality of display devices 31-1 to 31-9 operate in association with each other, as necessary, to display one or a plurality of images in different manners.

The multi-display apparatus 21 is configured to display images of different programs on the display devices 31-1 to 31-9 of which display screens are arranged in an array (or a matrix) of, for example, three rows and three columns or display an image of a program in an enlarged scale on the nine display devices 31-1 to 31-9 or on at least two of the display devices 31-1 to 31-9 according to a command from the remote controller 22. In the following description, the display devices 31-1 to 31-9 are referred to collectively as "display devices 31" or individually as a "display device 31" unless separately specified. The number of display devices in the multi-display apparatus 21 is not limited to nine, and any number of rows and columns of display devices may be arranged horizontally and vertically, respectively.

The multi-display apparatus 21 further includes a light-receiving unit 32 that receives light of a light signal into which a command sent from the remote controller 22 is converted. A command corresponding to the light received by the light-receiving unit 32 is supplied to the display devices 31.

Each of the display devices 31 is provided with a tuner and a display. While a combination of the plurality of display devices 31 serves as the multi-display apparatus 21, each of the display devices 31 can also serve as a generally available stand-alone television receiver. The display devices 31-1 to 31-9 are (electrically) connected to each other via a wired or wireless system (not shown), and each of the display devices 31-1 to 31-9 can operate solely or in conjunction with the other display devices 31.

The display devices 31 are configured to individually display images of programs desired by a user or collectively display an image of a single program in an enlarged scale according to a command from the remote controller 22 received by the light-receiving unit 32. The display devices 31 have a zoom function and a memo function, and are configured to zoom an image or images displayed thereon according to a command from the remote controller 22 for activating the zoom function (hereinafter referred to as a "zoom command") or to store an image or images displayed thereon according to a command from the remote controller 22 for activating the memo function (hereinafter referred to as a "memo command") to display the stored image or images later.

Further, each of the display devices 31 determines whether or not a user who is viewing an image displayed on the multi-display apparatus 21 has changed his/her line of sight on the basis of line-of-sight detection result data from the line-of-sight detection apparatus 23. If the user has changed his/her line of sight to an image displayed on one of the display devices 31, the one display device 31 stores the image currently displayed thereon and displays the stored image later.

In the display devices 31, therefore, images displayed thereon are temporarily stored according to a command from the remote controller 22 or a change in the user's line of sight.

The remote controller 22 includes an operation unit that is operated by a user. In response to an operation of the operation unit by a user, the remote controller 22 generates a command corresponding to the operation, and emits light to send the generated command in the form of a predetermined light signal.

The line-of-sight detection apparatus 23 includes a camera for capturing an eye or face image of a user who is viewing an image displayed on the multi-display apparatus 21, a computer for performing image processing, etc. An image signal of the eye image of the user captured by the camera is subjected to image processing to estimate the display device 31 to which the user directs his/her line of sight, i.e., the image displayed on the display device 31 viewed by the user. The line-of-sight detection apparatus 23 determines an identification (ID) number of the estimated display device 31 as a viewing-screen number, and supplies the determined viewing-screen number to the display devices 31 as line-of-sight detection result data.

Examples of the line-of-sight detection method performed by the line-of-sight detection apparatus 23 may include, but not limited to, using a reflected infrared image, and using a visible light image. The line-of-sight detection result data is not limited to a viewing-screen number, and, for example, coordinate values of the detected line of sight may be used as line-of-sight detection result data and supplied to the display devices 31. In this case, each of the display devices 31 performs processing, such as determining whether or not the line of sight has changed, on the basis of the coordinate values.

In the example shown in FIG. 2, each of the display devices 31 includes a tuner and a display. The tuners and the displays may not be contained in the display devices 31. Alternatively, nine tuners may be collectively mounted in the multi-display apparatus 21, or a display may be provided separately from the display devices 31 (in this case, the display devices 31 serve as display control devices).

Figure 3:
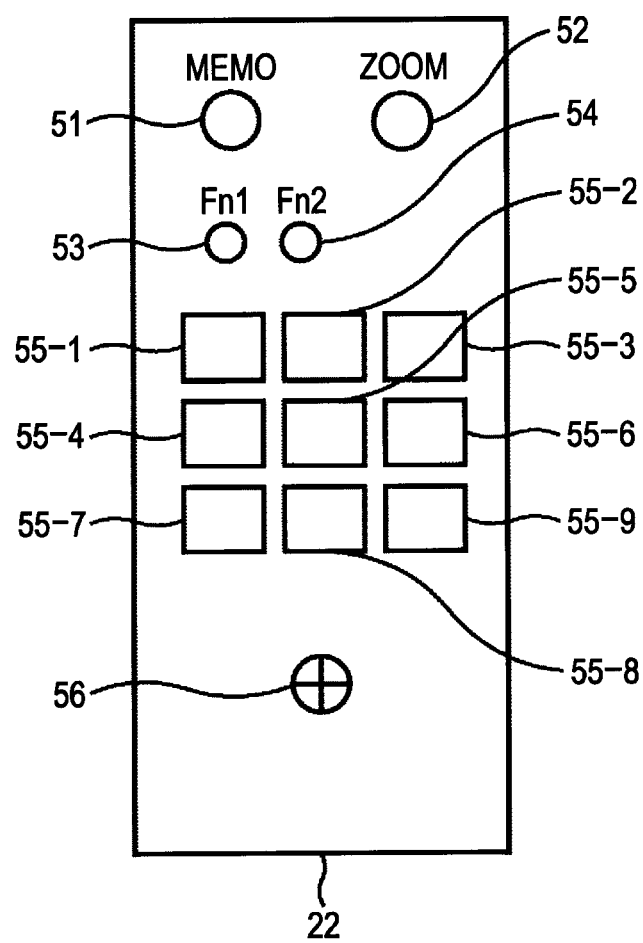
FIG. 3 is an external view showing an example of the structure of a remote controller shown in FIG. 2.

FIG. 3 is an external view showing an example of the structure of the remote controller 22 shown in FIG. 2.

In the example shown in FIG. 3, the remote controller 22 has on a front surface thereof a memo button 51, a zoom button 52, an Fn1 button 53, an Fn2 button 54, screen selection buttons 55-1 to 55-9, and an operating stick 56.

The memo button 51 is a button for a memo function for allowing the display device 31 selected using the screen selection buttons 55-1 to 55-9 to store an image displayed on the display device 31.

The zoom button 52 is a button for a zoom function for zooming and displaying an image displayed on the display device 31 selected using the screen selection buttons 55-1 to 55-9.

The Fn1 button 53 is a button for allowing an image stored according to the line-of-sight detection result data of the line-of-sight detection apparatus 23 to be displayed on the display device 31 selected using the screen selection buttons 55-1 to 55-9. The Fn2 button 54 is a button for allowing an image stored according to a memo command to be selected and displayed on the display device 31 selected using the selection screen buttons 55-1 to 55-9.

The screen selection buttons 55-1 to 55-9 are buttons for selecting images (screens) displayed on the display devices 31-1 to 31-9, respectively. In the following description, the screen selection buttons 55-1 to 55-9 are also referred to collectively as "screen selection buttons 55" or individually as a "screen selection button 55" unless separately specified. For example, when a single enlarged image is displayed on the plurality of display devices 31, the screen selection button 55 associated with any of the display devices 31 on which the enlarged image is displayed is pressed to select the corresponding portion of the enlarged image.

The operating stick 56 is mounted on the front surface of the remote controller 22 so as to project therefrom and to be inclinable in 360-degree directions with respect to the front surface of the remote controller 22. The operating stick 56 can be used to issue an instruction in accordance with the inclined angle and direction of the operating stick 56 to the display device 31 selected using the screen selection buttons 55-1 to 55-9 or to the multi-display apparatus 21.

For example, when the user presses any of the screen selection buttons 55 on the remote controller 22, a screen selection command is generated and transmitted to the display devices 31. One of the display devices 31 associated with the pressed screen selection button 55 sets its screen to a selected mode, and the other display devices 31 release the selected mode if the screens of the other display devices 31 are in the selected mode.

After the screen selection button 55 is selected, when the user presses the memo button 51, a memo command is generated and transmitted. After the screen selection button 55 is selected, when the user presses the zoom button 52, a zoom command is generated and transmitted. After the screen selection button 55 is selected, when the user presses the Fn1 button 53 or the Fn2 button 54, a memory-image selection command is generated and transmitted. Those commands are received and executed by the display device 31 that is associated with the screen selection button 55 pressed by the user and that has recognized that its screen is in the selected mode.

In the example shown in FIG. 3, only relevant tools in the remote controller 22 shown in FIG. 2 are illustrated, and other tools such as a power button and tools for channel selection and volume control are omitted.

Figure 4:
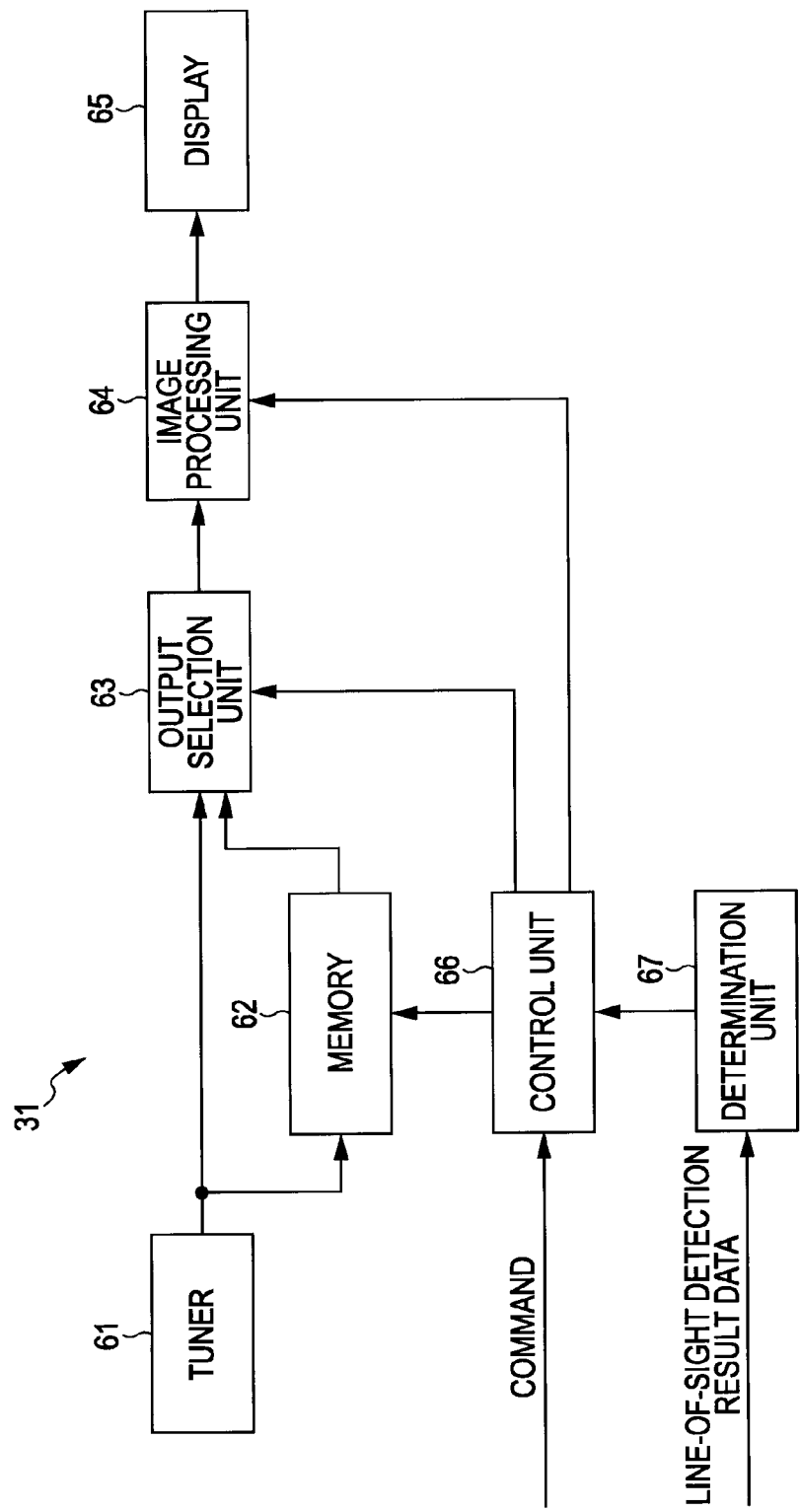
FIG. 4 is a block diagram showing an example of the structure of a display device shown in FIG. 2.

FIG. 4 is a diagram showing an example of the electrical structure of the display devices 31-1 to 31-9 shown in FIG. 2. In the example shown in FIG. 4, a section for processing audio signals is omitted.

The display device 31 shown in FIG. 4 includes a tuner 61, a memory 62, an output selection unit 63, an image processing unit 64, a display 65, a control unit 66, and a determination unit 67.

The tuner 61 demodulates a broadcast signal received from a broadcast station via an antenna (not shown) using a predetermined method, and outputs an image signal in the demodulated signal to the memory 62 and the output selection unit 63. Thus, the memory 62 stores an image of the image signal to be output to the display 65 via the output selection unit 63 and the image processing unit 64. The memory 62 and the output selection unit 63 receive not only the image signal from the tuner 61 but also an image signal from an external recording apparatus or playback apparatus.

The memory 62 is formed of, for example, a non-volatile memory or a volatile memory, and temporarily stores an image of an image signal input from the tuner 61 and output to the display 65 under the control of the control unit 66. For example, an image of an image signal input at the time of a change in the user's line of sight and output to the display 65 is stored in the memory 62 as a memory image #1, and an image of an image signal input at the time of the reception of a memo command and output to the display 65 is stored in the memory 62 as a memory image #2.

The output selection unit 63 selects the image signal input from the tuner 61 or the image signal corresponding to the memory image stored in the memory 62 under the control of the control unit 66, and outputs the selected image signal to the image processing unit 64. The output selection unit 63 further selects either the memory image #1 or memory image #2 stored in the memory 62 under the control of the control unit 66 to read an image signal corresponding to the selected memory image, and outputs the read image signal to the image processing unit 64.

The image processing unit 64 performs predetermined image processing on the image signal output from the output selection unit 63. The image processing unit 64 also performs image zoom processing according to the control from the control unit 66. The image signal subjected to the image processing is output to the display 65. The display 65 displays the image corresponding to the image signal output from the image processing unit 64. Therefore, the display 65 can also enlarge and display the image corresponding to the image signal output from the tuner 61 or the image signal read from the memory 62.

Upon receiving a command from the remote controller 22 via the light-receiving unit 32, the control unit 66 changes the selected mode of the screen of the display device 31, updates the memory image #2 stored in the memory 62, selects an output image, or controls zoom parameters, etc., according to the received command.

If the received command is a screen selection command for selecting the screen of the display device 31, the control unit 66 changes the screen to the selected mode. If the received command is a screen selection command for selecting any other screen and if the screen of the display device 31 is in the selected mode, the control unit 66 releases the selected mode of the screen.

If the received command is a memo command, the control unit 66 updates the memory image #2 stored in the memory 62 with an image of an image signal input to the memory 62 at the time of the reception of the memo command and output to the display 65, and further controls the output selection unit 63 so as to read the image signal of the memory image stored in the memory 62 (the memory image #1 or the memory image #2). If the received command is a memory-image selection command, the control unit 66 controls the output selection unit 63 so as to read the image signal of the memory image corresponding to the command. If the received command is a zoom command, the control unit 66 supplies the zoom parameters to the image processing unit 64, and controls the image processing unit 64 so as to perform image zoom processing on the image signal.

The control unit 66 also controls to update the memory image #1 stored in the memory 62 in response to a notification of the time of a change in the user's line of sight from the determination unit 67. Specifically, the control unit 66 updates the memory image #1 stored in the memory 62 with an image of an image signal input to the memory 62 at the time of a change in the user's line of sight and output to the display 65.

The determination unit 67 detects a change in the user's line of sight on the basis of the line-of-sight detection result data from the line-of-sight detection apparatus 23, and notifies the control unit 66 of the time of the change in the user's line of sight.

Figure 5:
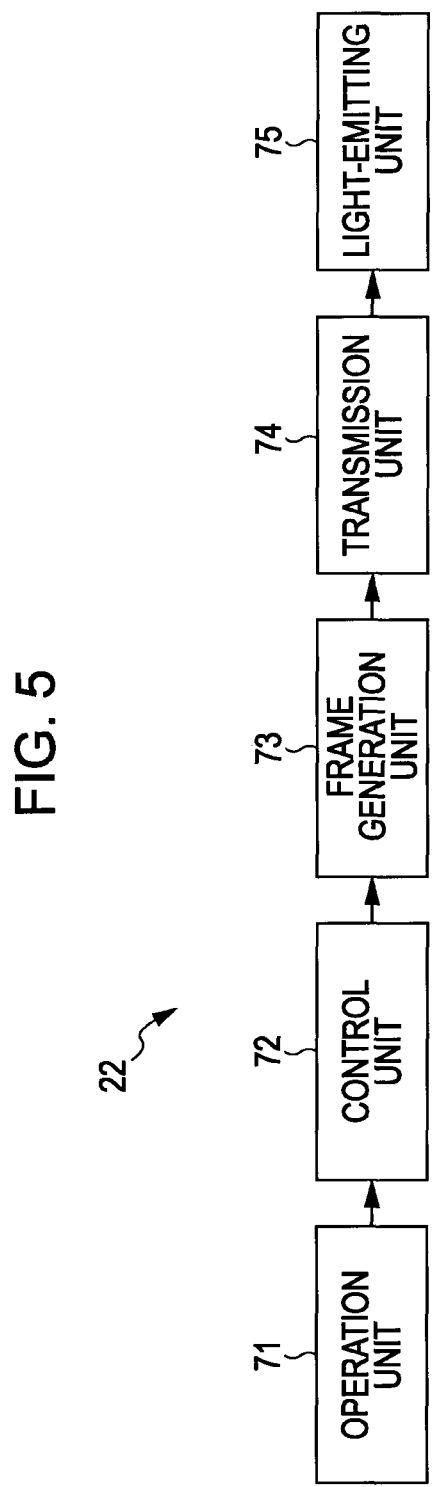
FIG. 5 is a block diagram showing an example of the electrical structure of the remote controller shown in FIG. 2.

FIG. 5 is a diagram showing an example of the electrical structure of the remote controller 22 shown in FIG. 2.

In the example shown in FIG. 5, the remote controller 22 includes an operation unit 71, a control unit 72, a frame generation unit 73, a transmission unit 74, and a light-emitting unit 75.

The operation unit 71 includes the components shown in FIG. 3, i.e., the memo button 51, the zoom button 52, the Fn1 button 53, the Fn2 button 54, the screen selection button 55, and the operating stick 56, and inputs an operation signal corresponding to a user's operation to the control unit 72. The control unit 72 generates a command recognizable by the display devices 31 on the basis of the operation signal input via the operation unit 71, and outputs the generated command to the frame generation unit 73.

The frame generation unit 73 generates a transmission frame based on the command output from the control unit 72, and transmits the transmission frame to the transmission unit 74. The transmission unit 74 converts the transmission frame generated by the frame generation unit 73 into a light-emission signal to cause the light-emitting unit 75 to emit light.

A process for recording an image using line-of-sight information will be described with reference to FIGS. 6 and 7.

In an upper portion of FIG. 6, images G3 displayed on the display device 31-3 (hereinafter also referred to as "screens G3 of the display device 31-3) at times T1 and T2 (time T1<time T2) are illustrated.

Figure 6:
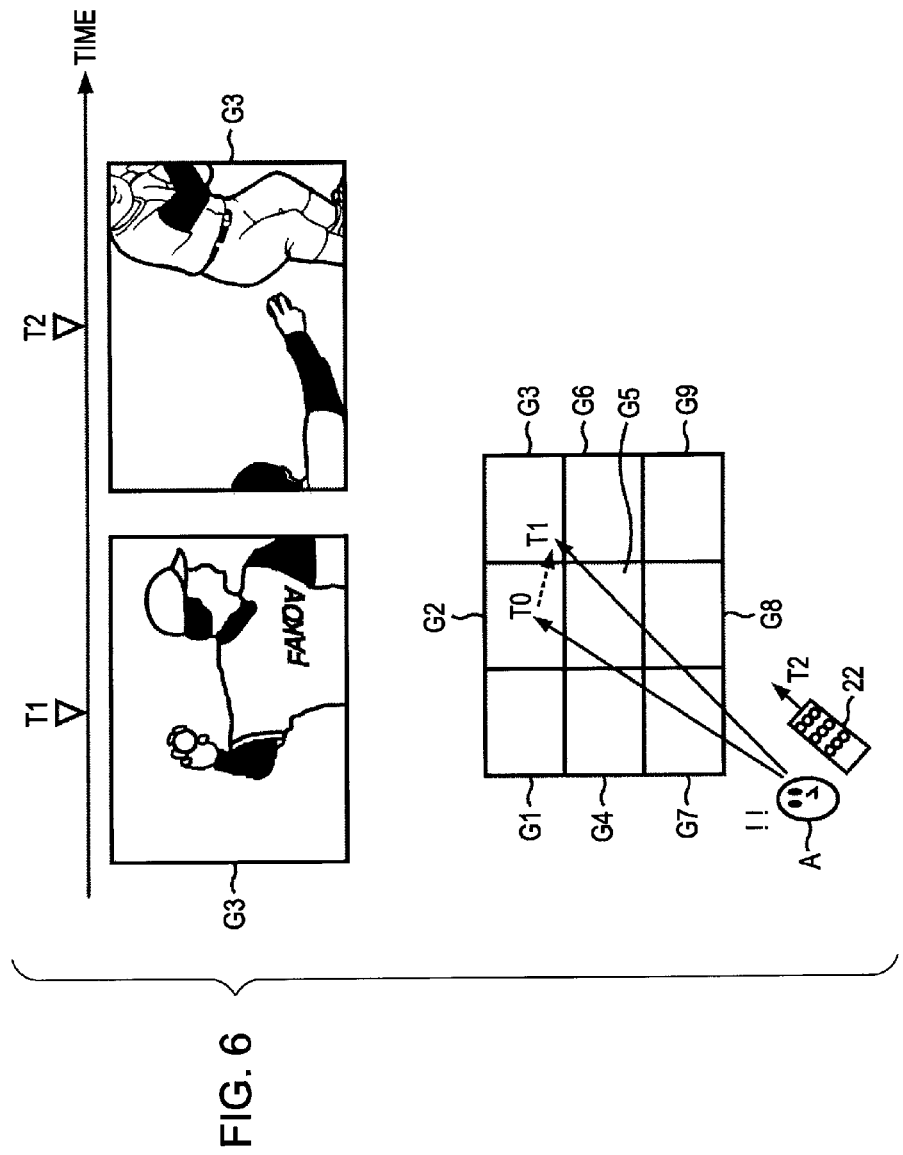
FIG. 6 is a diagram showing a process for recording an image using line-of-sight information.

As shown in a lower portion of FIG. 6, at a time T0 (time T0<time T1), a user A views a screen G2 of the display device 31-2 among screens G1 to G9 of the display devices 31-1 to 31-9. At the time T1, the user A changes his/her line of sight to the screen G3 of the display device 31-3. At the moment of the time T1 when the user A changes his/her line of sight from the screen G2 to the screen G3, the user A notices the presence of information of interest (hereinafter also referred to as an "object") on the screen G3.

To record the object being displayed on the screen G3 (e.g., the pitcher's grip before throwing the ball when the pitcher cocks his arm), for example, the user A presses the screen selection button 55-3 on the remote controller 22 to select the screen G3 of the display device 31-3, and then presses the memo button 51 at the time T2. However, the information on the screen G3 has already changed at the moment of the time T2 when the user A presses the memo button 51, and the user A may fail to record the object displayed at the moment of the time T1 on the screen G3. In the example shown in FIG. 6, the screen G3 displayed at the time T2 shows an image of a moment when the pitcher throws the ball.

Therefore, as shown in FIG. 6, the display device 31-3 estimates the moment when the user A changes his/her line of sight to the screen G3 to be the moment when the user A desires to make a memo of (or record) the screen G3, and records an image displayed on the screen G3 at the moment when the user's line of sight changes (i.e., the screen G3 displayed at the time T1) in the memory 62 in advance. Then, the image recorded in the memory 62 is displayed on the screen G3 at the time T2 when the user A actually presses the memo button 51.

This feature will be specifically described with reference to FIG. 7. In the example shown in FIG. 7, at the time T0, the user A directs his/her line of sight to the screen G2 of the display device 31-2 among the screens G1 to G9 of the display devices 31-1 to 31-9. At the time T1, the user A changes his/her line of sight from the screen G2 to the screen G3 of the display device 31-3. In FIG. 7, a change in the screen viewed by the user A over time, and a change in the output image displayed on the screen G3 over time are also illustrated.

At the time T1 when the screen viewed by the user A is changed from the screen G2 to the screen G3 based on the viewing-screen number output from the line-of-sight detection apparatus 23, i.e., when the user A changes his/her line of sight from the screen G2 to the screen G3, the display device 31-3 stores the information displayed at the time T1 on the screen G3 in the memory 62 as a memory image #1. At the time T2 when the user A actually presses the memo button 51, the display device 31-3 stores the information displayed at the time T2 on the screen G3 in the memory 62 as a memory image #2.

Further, as indicated by the output image on the screen G3, at the time T2, the display device 31-3 switches an output image on the screen G3 from the image output from the tuner 61 to the memory image #1. A presetting may be performed so as to switch an output image on the screen G3 to the memory image #2 instead of the memory image #1.

Accordingly, the moment when the user A moves his/her line of sight is estimated to be the moment when the user A desires to make a memo, and an image displayed when a change in the line of sight of the user A is detected is recorded. Therefore, for example, even if the user A hesitates to operate the remote controller 22, failure to catch an object of interest can be avoided.

A process of the display device 31 for recording an image using line-of-sight information will be described in detail with reference to a flowchart shown in FIG. 8.

For example, the power of the multi-display apparatus 21 is turned on, and the tuner 61 of the display device 31 demodulates a broadcast signal received from a broadcast station via the antenna (not shown) using a predetermined method, and outputs an image signal in the demodulated signal to the memory 62 and the output selection unit 63. The output selection unit 63 selects the image signal input from the tuner 61 under the control of the control unit 66, and outputs the selected image signal to the image processing unit 64. The image processing unit 64 performs predetermined image processing on the image signal output from the output selection unit 63, and outputs the resulting image signal to the display 65. The display 65 displays an image corresponding to the image signal output from the image processing unit 64.

In step S11, the control unit 66 checks a preset dual in-line package (DIP) switch or the like to obtain the ID number of the display device 31. The ID number may be obtained by, instead of using the DIP switch, communicating with the other display devices 31.

A user is viewing an image displayed on the display 65 of any of the display devices 31-1 to 31-9 (e.g., an image displayed on the display device 31-3, i.e., the screen G3 of the display device 31-3).

The line-of-sight detection apparatus 23 captures an eye or face image of a user who is viewing an image displayed on the multi-display apparatus 21, and performs image processing on the captured eye image of the user to estimate the display device 31 to which the user directs his/her line of sight, i.e., the screen of the display device 31 viewed by the user. The line-of-sight detection apparatus 23 determines the ID number of the estimated display device 31 as a viewing-screen number, and supplies the determined viewing-screen number to the display devices 31 as line-of-sight detection result data.

Since the line of sight is unstable, a viewing-screen number of a screen is determined if it is determined that the screen is viewed over several consecutive samples. If it is estimated that none of the screens of the display devices 31 is viewed by the user, viewing-screen number "−1" is supplied to the display devices 31 as line-of-sight detection result data. For example, if the viewing-screen number is changed from the ID number of any of the display devices 31 to the viewing-screen number "−1", no image is stored in the memory 62 of any of the display devices 31.

In step S12, the determination unit 67 obtains the line-of-sight detection result data from the line-of-sight detection apparatus 23 to detect a change in the user's line of sight on the basis of the line-of-sight detection result data obtained from the line-of-sight detection apparatus 23, and notifies the control unit 66 of the time of the change in the user's line of sight. The control unit 66 is also notified of the ID number of the line-of-sight destination.

In step S13, the control unit 66 performs a memory control process. The memory control process will be described with reference to a flowchart shown in FIG. 9.

In step S31, the control unit 66 determines whether or not a change in the line of sight has occurred. If the control unit 66 is notified of the time of a change in the user's line of sight by the determination unit 67, it is determined in step S31 that a change in the line of sight has occurred, and the process proceeds to step S32.

In step S32, the control unit 66 determines whether or not the line of sight has been changed to the screen of the display device 31 on the basis of the ID number of the line-of-sight destination notified by the determination unit 67. If there is a match between the ID number of the line-of-sight destination notified by the determination unit 67 and the ID number of the display device 31 obtained in step S11 shown in FIG. 8, it is determined in step S32 that the line of sight has been changed to the screen of the display device 31, and the process proceeds to step S33.

In step S33, the control unit 66 determines whether or not the memory 62 is in a protected mode. If it is determined that the memory 62 is not in the protected mode, i.e., the protected mode of the memory 62 has been released, the process proceeds to step S34.

For example, an image recorded in the memory 62 at the moment when the user A changes his/her line of sight, which is estimated to be the moment when the user A desires to make a memo, may be overwritten by an accidental action of the user A. For example, the user A may accidentally move his/her line of sight during a zoom operation of the image, and an image displayed at the time of the action may be recorded in the memory 62 to overwrite the previous image.

A user's operation of pressing the memo button 51 can be considered as a clearly intended operation to make a memo of a current image. Therefore, when the user operates the memo button 51 (i.e., upon receiving a memo command from the remote controller 22), the display device 31 sets the image stored in the memory 62 to the protected (or overwrite prohibited) mode (step S43 shown in FIG. 10, as described below). If the user's operation of the remote controller 22 is not performed for a predetermined period of time or longer, the display device 31 releases the protected mode of the memory 62 (step S22 shown in FIG. 8).

Therefore, if the memory 62 is not in the protected mode, in step S34, the control unit 66 stores the image of the image signal input to the memory 62 as a memory image #1. Specifically, the control unit 66 updates the memory image #1 stored in the memory 62 with an image of an image signal input to the memory 62 at the time of the change in the user's line of sight and output to the display 65. Then, the process returns to step S13 shown in FIG. 8 and proceeds to step S14.

Figure 8:
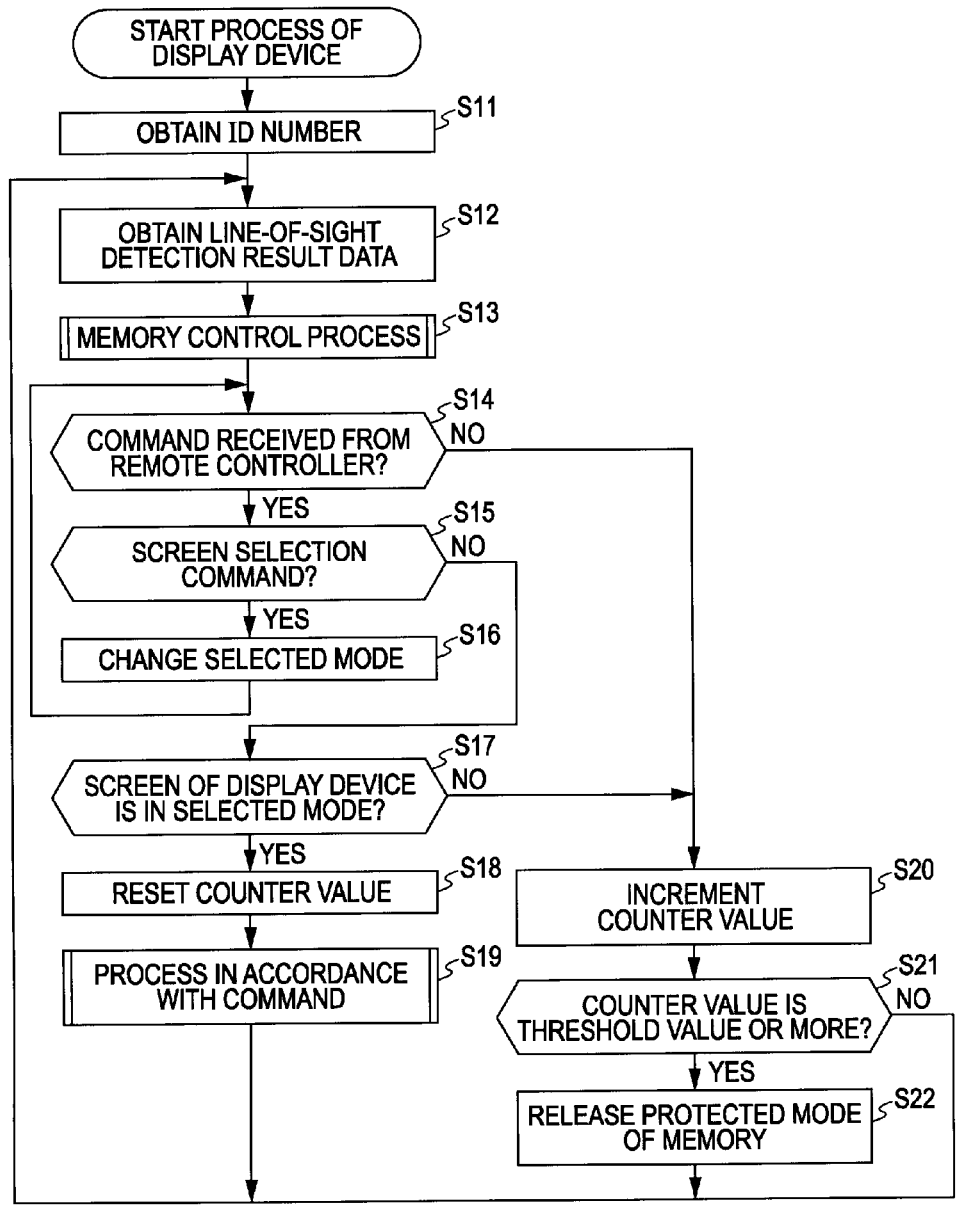
FIG. 8 is a flowchart showing a process of the display device shown in FIG. 2.

If it is determined in step S31 that no change in the line of sight has occurred, or if it is determined in step S32 that the line of sight has not been changed to the screen of the display device 31, or if it is determined in step S33 that the memory 62 is in the protected mode, the process also returns to step S13 shown in FIG. 8 and proceeds to step S14.

Referring back to FIG. 8, in step S14, the control unit 66 determines whether or not a command has been received from the remote controller 22. If it is determined that a command has been received from the remote controller 22, in step S15, it is determined whether or not the received command is a screen selection command.

If it is determined in step S15 that the received command is a screen selection command, in step S16, the control unit 66 changes the selected mode of the screen of the display device 31 according to the screen selection command. For example, if the received command is a screen selection command for selecting the screen of the display device 31, the control unit 66 changes the screen to the selected mode. If the received command is a screen selection command for selecting the screen of any other display device 31 and if the screen of the display device 31 is in the selected mode, the control unit 66 releases the selected mode. Then, the process returns to step S14, and the subsequent processing is repeated.

If it is determined in step S15 that the received command is not a screen selection command, the process skips step S16. In step S17, the control unit 66 determines whether or not the screen of the display device 31 is in the selected mode. If it is determined in step S17 that the screen is in the selected mode, in step S18, the control unit 66 resets a counter value.

The control unit 66 includes an internal counter (not shown) for measuring a count of the occurrence of the event upon which a command directed to the display device 31 has not been received from the user. Since it is determined in step S17 that the screen is in the selected mode, i.e., the command received from the remote controller 22 is a command directed to the display device 31, in step S18, the value of the counter is reset.

In step S19, the control unit 66 performs a process in accordance with the command. The process in accordance with the command will be described with reference to a flowchart shown in FIG. 10.

In step S41, the control unit 66 determines whether or not the received command is a memo command. If it is determined that the received command is a memo command, in step S42, the control unit 66 stores the image of the image signal input to the memory 62 as a memory image #2. Specifically, the control unit 66 updates the memory image #2 stored in the memory 62 with an image of an image signal input to the memory 62 at the time of the reception of the memo command and output to the display 65. Then, the process proceeds to step S43.

In step S43, the control unit 66 sets the memory 62 to the protected mode. Thus, the memory image #1 and memory image #2 stored in the memory 62 are prohibited from being overwritten until it is determined that the user's operation of the remote controller 22 is not performed for a predetermined period of time or longer.

In step S44, the control unit 66 controls the selection of the output selection unit 63 so as to read the image signal of the memory image #1 stored in the memory 62. That is, the output selection unit 63 selects the memory image #1 stored in the memory 62 to read the image signal of the selected memory image, and outputs the read image signal to the image processing unit 64. The image signal subjected to image processing by the image processing unit 64 is output to the display 65. The display 65 displays the memory image #1 corresponding to the image signal output from the image processing unit 64.

A presetting may be preformed so as to display the memory image #2 in step S44.

If it is determined in step S41 that the received command is not a memo command, the process skips steps S42 to S44 and proceeds to step S45. In step S45, the control unit 66 determines whether or not the received command is a memory-image selection command. If it is determined that the received command is a memory-image selection command, in step S46, the control unit 66 controls the output selection unit 63 so as to read the image signal of the memory image in accordance with the command (the memory image #1 or the memory image #2).

Specifically, if the received command is a memory-image selection command generated by pressing the Fn1 button 53, the output selection unit 63 selects the memory image #1 stored in the memory 62 to read the image signal of the selected memory image #1, and outputs the read image signal to the image processing unit 64. If the received command is a memory-image selection command generated by pressing the Fn2 button 54, the output selection unit 63 selects the memory image #2 stored in the memory 62 to read the image signal of the selected memory image #2, and outputs the read image signal to the image processing unit 64.

The image signal subjected to image processing by the image processing unit 64 is output to the display 65. The display 65 displays the memory image #1 or memory image #2 corresponding to the image signal from the image processing unit 64.

If it is determined in step S45 that the received command is not a memory-image selection command, the process skips step S46 and proceeds to step S47. In step S47, the control unit 66 determines whether or not the received command is a zoom command. If it is determined that the received command is a zoom command, the process proceeds to step S48.

In step S48, the control unit 66 sends zoom parameters (such as zoom magnification and zoom range) in accordance with the command to the image processing unit 64, and controls the image processing unit 64 so as to perform image zoom processing on the image signal. Specifically, the image processing unit 64 performs predetermined image processing on the image signal output from the output selection unit 63, and performs image zoom processing on the image signal on the basis of the zoom parameters sent from the control unit 66. The resulting image signal is output to the display 65, and the display 65 displays an image corresponding to the image signal subjected to the zoom processing on the basis of the zoom parameters.

If it is determined in step S47 that the received command is not a zoom command, the process skips step S48, and returns to step S19 shown in FIG. 8. Then, the process further returns to step S12, and the subsequent processing is repeated.

If it is determined in step S14 shown in FIG. 8 that no command has been received from the remote controller 22, or if it is determined in step S17 that the screen is not in the selected mode, the process proceeds to step S20. Since no command directed to the display device 31 has been received, in step S20, the control unit 66 increments the value of the internal counter.

In step S21, the control unit 66 determines whether or not the value of the counter is equal to or more than a predetermined threshold value. If it is determined that the value of the counter is equal to or more than the predetermined threshold value, i.e., when a period of time not less than the threshold value has elapsed since the display device 31 received the last command, in step S22, the control unit 66 releases the protected mode of the memory 62. Therefore, a write to the memory 62 is permitted in accordance with the line-of-sight detection result data or the memo command.

If it is determined in step S21 that the value of the counter is less than the threshold value, the process skips step S22 and returns to step S12, and the subsequent processing is repeated.

Accordingly, the moment when the user moves his/her line of sight is estimated to be the moment when the user desires to make a memo, and an image displayed on the line-of-sight destination is recorded in the memory 62 when the user changes his/her line of sight. Therefore, for example, even if the user hesitates to operate the remote controller 22, failure to catch an object of interest can be avoided.

Further, an image displayed on the display device 31 as a target to be operated (set to the selected mode) when a memo command is received is also recorded in the memory 62 separately from the image displayed on the line-of-sight destination. Therefore, an image displayed when the user successfully operates the remote controller 22 can also be obtained.

Further, if there exists a memory image stored in the memory 62 according to a memo command, the memory 62 is set to the protected mode so as to prevent the memory image from being overwritten. This can prevent the memory image stored in the memory 62 from being deleted by a user's accidental action such as moving his/her line of sight during the operation of the remote controller 22.

Figure 11:
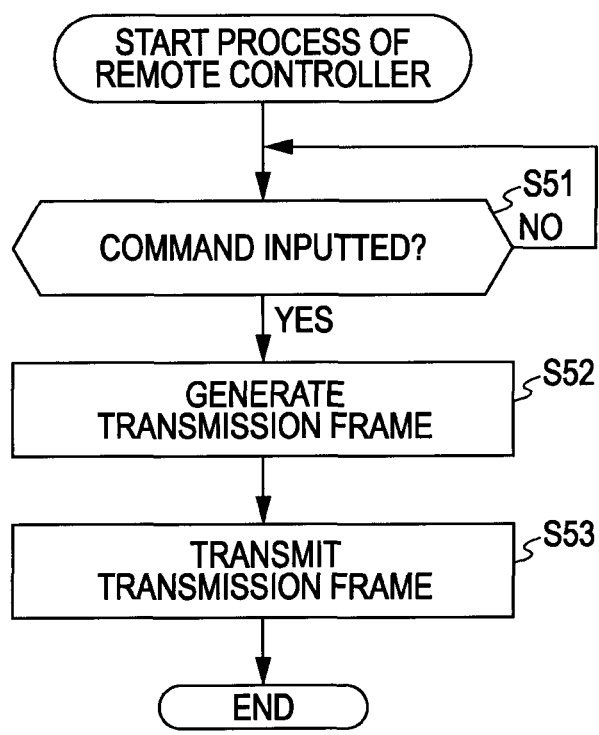
FIG. 11 is a flowchart showing a process of the remote controller shown in FIG. 2.

A process of the remote controller 22 corresponding to the process shown in FIG. 8 will now be described with reference to a flowchart shown in FIG. 11.

For example, the user operates the component of the operation unit 71 shown in FIG. 3, such as the memo button 51, the zoom button 52, the Fn1 button 53, the Fn2 button 54, the screen selection button 55, or the operating stick 56. The control unit 72 generates a command recognizable by the display devices 31 on the basis of the operation signal input via the operation unit 71, and outputs the generated command to the frame generation unit 73.

In step S51, the frame generation unit 73 waits for a command to be input. If it is determined that a command has been input, in step S52, the frame generation unit 73 generates a transmission frame based on the command from the control unit 72, and transmits the transmission frame to the transmission unit 74. In step S53, the transmission unit 74 converts the transmission frame generated by the frame generation unit 73 into a light-emission signal to cause the light-emitting unit 75 to emit light. Thus, the light-receiving unit 32 of the display device 31 receives the light from the remote controller 22, and transmits a command corresponding to the received light to the display devices 31.

Figure 12:
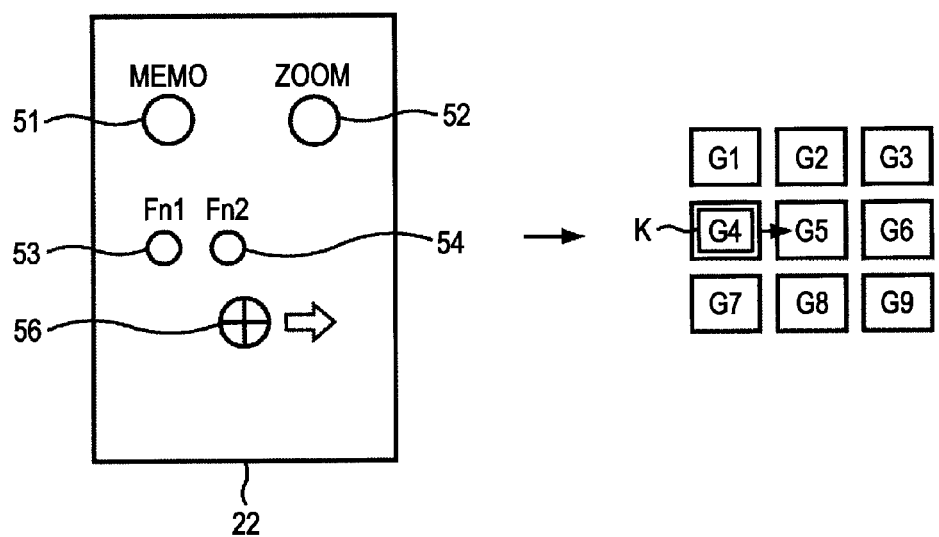
FIG. 12 is an external view showing another example of the structure of the remote controller shown in FIG. 2.

FIG. 12 is an external view showing another example of the structure of the remote controller 22 shown in FIG. 2. Unlike the remote controller 22 shown in FIG. 3, the screen selection buttons 55-1 to 55-9 are not provided on a front surface of the remote controller 22 shown in FIG. 12. As in the remote controller 22 shown in FIG. 3, the remote controller 22 shown in FIG. 12 includes on the front surface thereof a memo button 51, a zoom button 52, an Fn1 button 53, an Fn2 button 54, and an operating stick 56.

In the remote controller 22 shown in FIG. 12, therefore, instead of using the screen selection buttons 55-1 to 55-9, the user operates the operating stick 56 in the vertical, horizontal, or diagonal direction to move a cursor K for selecting one of the screens G1 to G9 of the display devices 31-1 to 31-9 to a desired screen, thereby selecting one of the screens G1 to G9.

In the example shown in FIG. 12, the operating stick 56 is inclined to the right in FIG. 12 to move the cursor K placed on the screen G4 to the screen G5 (to the right in FIG. 12).

Accordingly, the tool for selecting a screen is not limited to the screen selection buttons 55-1 to 55-9 shown in FIG. 3, and may be implemented by the operating stick 56 shown in FIG. 12.

A process for recording a moving image, instead of a still image, using line-of-sight information will be described with reference to FIG. 13.

In the foregoing description, to address a situation where a user finds an object to make a memo of at the moment when the user moves his/her line of sight from a certain screen to another screen, two images, that is, an image displayed when the user moves his/her line of sight and an image displayed when the user operates the memo button 51, are recorded. In some cases, however, an object of which a user desires to make a memo may appear for a period of time during which the user is moving his/her line of sight and viewing through screens, rather than at the moment when the user moves his/her line of sight from a certain screen to another screen. In such cases, two images may be insufficient to successfully record the object.

In such cases, if a sufficient memory capacity is available, a sequence of images displayed for a period of time after the user has changed his/her line of sight and before the user operates the memo button 51, rather than an image displayed when the user changes his/her line of sight, is recorded as a moving image. Therefore, the user can obtain images including a desired object. Specifically, in such cases, a predetermined period of time after the moment when the user changes his/her line of sight, rather than the moment when the user changes his/her line of sight, is estimated to be a period of time in which information of interest may be shown, and image signals occurring during that period of time are recorded in the memory 62 as a moving image so that a desired frame of the moving image can be selected later by operating the remote controller 22.

Figure 7:
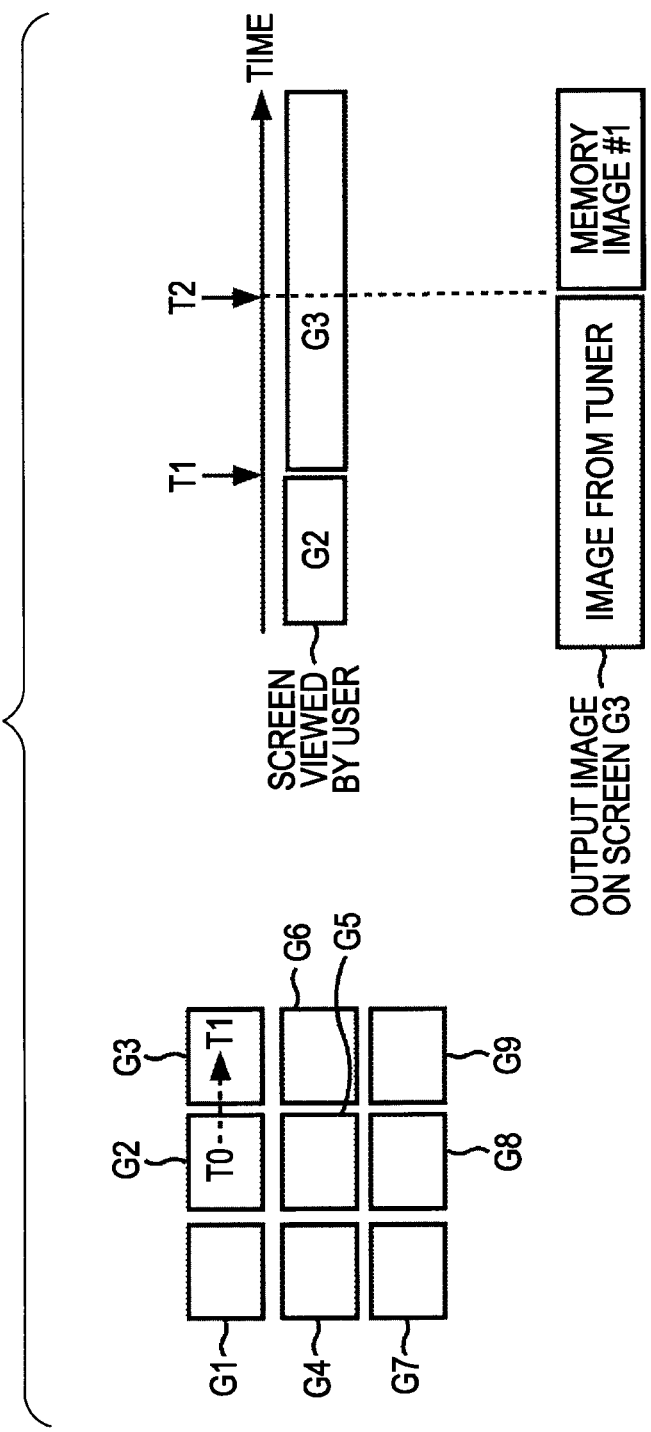
FIG. 7 is a diagram showing the process for recording an image using line-of-sight information.
Figure 13:
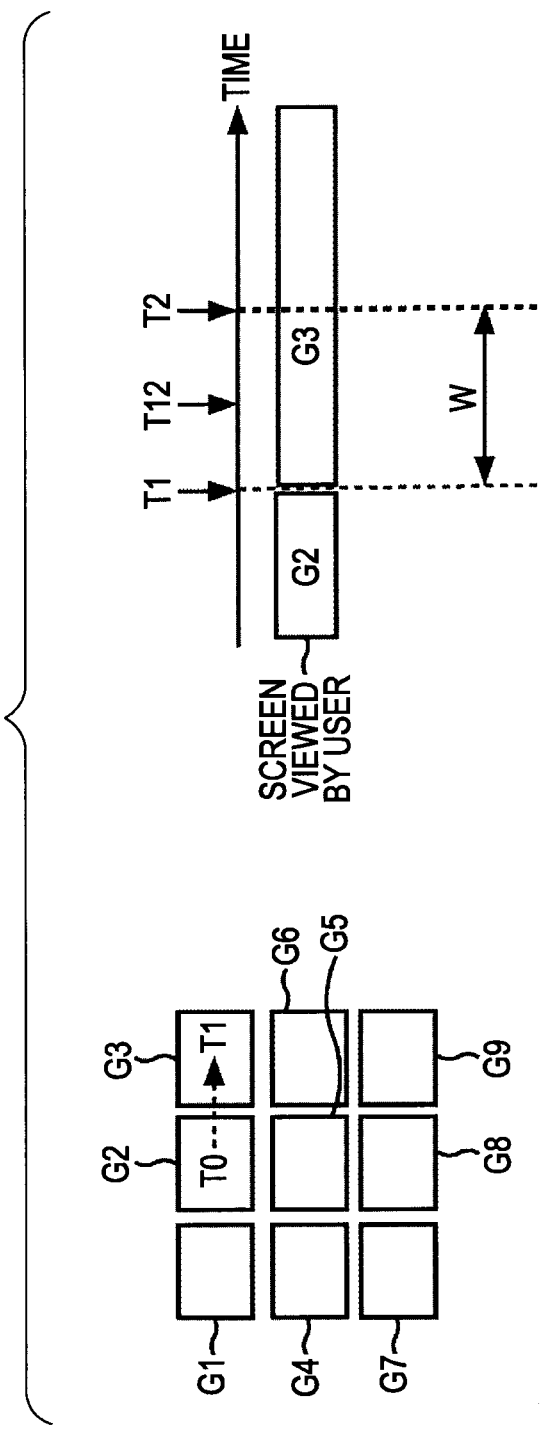
FIG. 13 is a diagram showing a process for recording a moving image using line-of-sight information.

In the example shown in FIG. 13, as in the example shown in FIG. 7, at a time T0, the user A directs his/her line of sight to the screen G2 of the display device 31-2 among the screens G1 to G9 of the display devices 31-1 to 31-9. At time T1, the user A changes his/her line of sight from the screen G2 to the screen G3 of the display device 31-3. In FIG. 13, a change in the screen viewed by the user A over time is also illustrated.

If a change in the screen viewed by the user A to the screen G3 from the screen G2 is detected on the basis of the viewing-screen number output from the line-of-sight detection apparatus 23, i.e., if the user A changes his/her line of sight from the screen G2 to the screen G3, the display device 31-3 stores in the memory 62, as a moving image, information displayed on the screen G3 for a time period W starting from the time T1 when the user A changes his/her line of sight from the screen G2 to the screen G3 to, for example, a time T2 when the user A actually presses the memo button 51.

Therefore, for example, even if the user A finds the presence of information of interest on the screen G3 at a time T12 (time T1<time T12<time T2) at which a certain time has elapsed since the time T1 when the user A changed his/her line of sight from the screen G2 to the screen G3, the user A can check the stored moving image later to view the desired information.

Accordingly, a predetermined period of time after the moment when the user A changes his/her line of sight is estimated to be a period of time in which information of which the user A desires to make a memo is shown, and a moving image displayed during that period of time is recorded. Therefore, for example, even if the user A hesitates to operate the remote controller 22, failure to catch an object of interest can be avoided. The predetermined period of time can be specified, but it depends on the remaining capacity of the memory 62.

Figure 14:
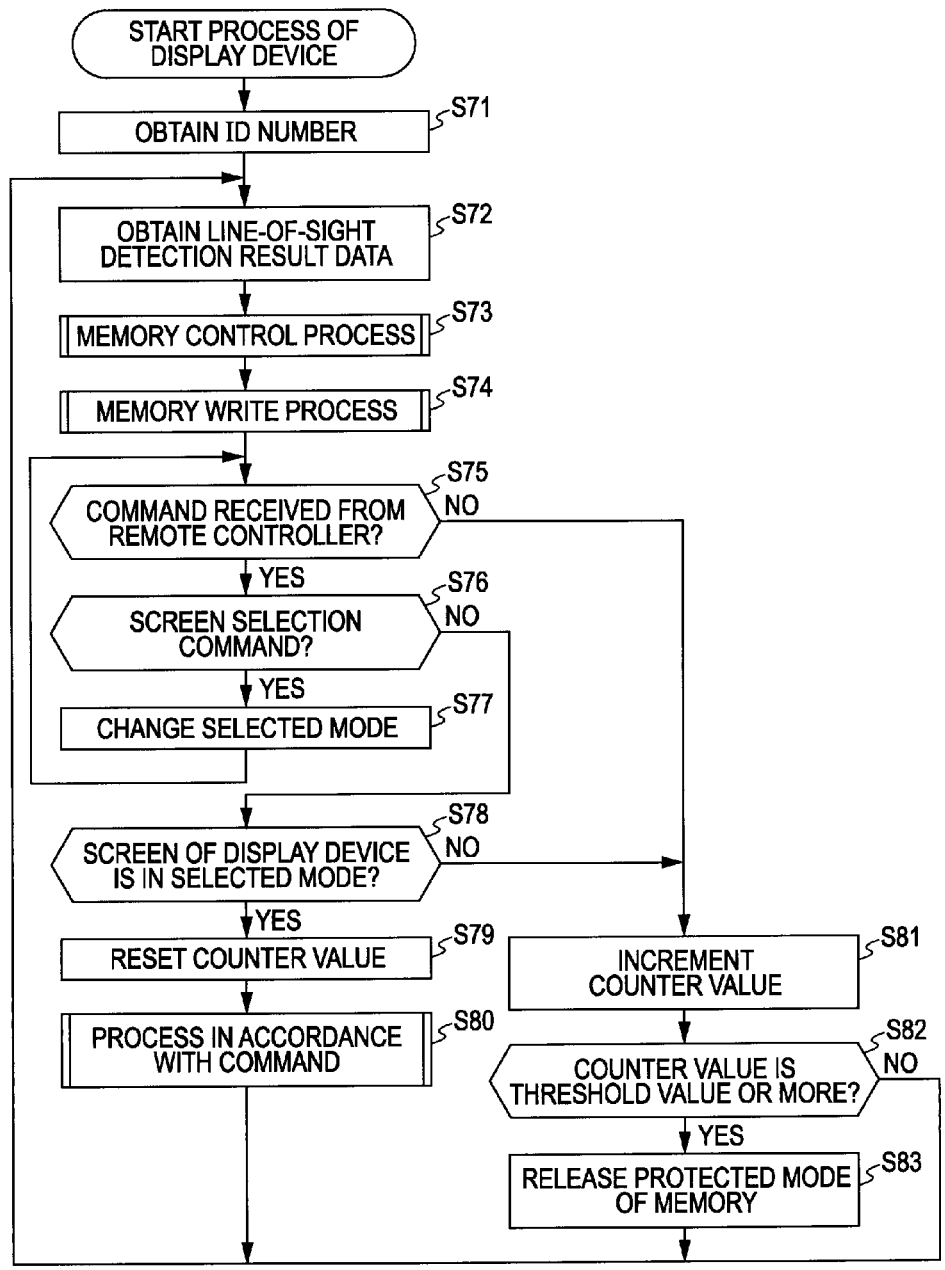
FIG. 14 is a flowchart showing a process of the display device shown in FIG. 2 in the case shown in FIG. 13.

A process for recording a moving image using line-of-sight information by the display device 31 in the example shown in FIG. 13 will be described in detail with reference to a flowchart shown in FIG. 14. The process shown in FIG. 14 is different from that shown in FIG. 8 in the processing of steps S73 and S74. The remaining processing of steps S71, S72, and S75 to S83 is basically similar to the processing of steps S11, S12, and S14 to S22 shown in FIG. 8, respectively, and a detailed description thereof is thus omitted to avoid redundancy.

In step S71, the control unit 66 checks a preset DIP switch or the like to obtain the ID number of the display device 31.

The line-of-sight detection apparatus 23 captures an eye or face image of a user who is viewing an image displayed on the multi-display apparatus 21, and performs image processing on the captured eye image of the user to estimate the display device 31 to which the user directs his/her line of sight, i.e., the screen of the display device 31 viewed by the user. The line-of-sight detection apparatus 23 determines the ID number of the estimated display device 31 as a viewing-screen number, and supplies the determined viewing-screen number to the display devices 31 as line-of-sight detection result data.

In step S72, the determination unit 67 obtains the line-of-sight detection result data from the line-of-sight detection apparatus 23 to detect a change in the user's line of sight on the basis of the line-of-sight detection result data obtained from the line-of-sight detection apparatus 23, and notifies the control unit 66 of the time of the change in the user's line of sight. The control unit 66 is also notified of the ID number of the line-of-sight destination.

Figure 15:
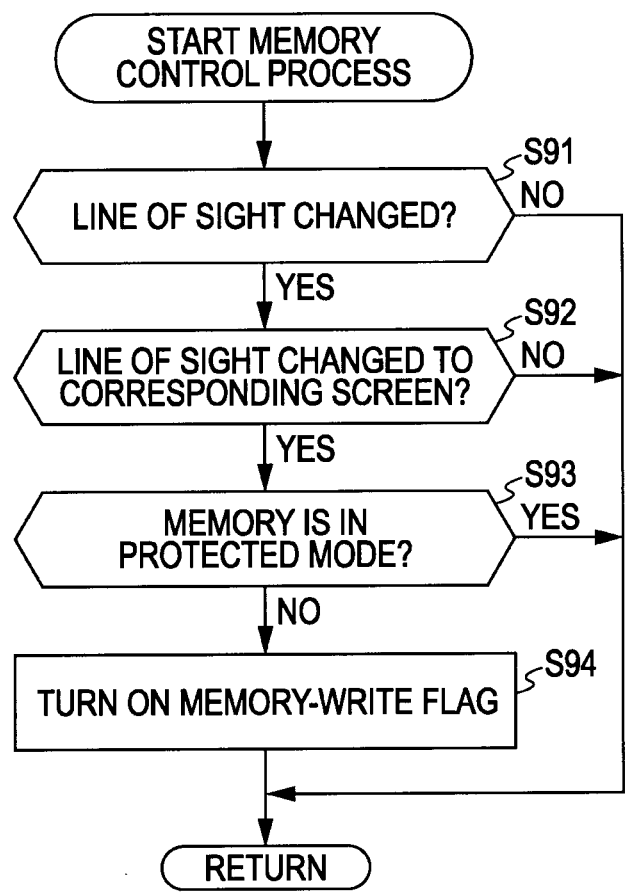
FIG. 15 is a flowchart showing a memory control process in step S73 shown in FIG. 14.

In step S73, the control unit 66 performs a memory control process. The memory control process will be described with reference to a flowchart shown in FIG. 15. The process shown in FIG. 15 is different from that shown in FIG. 9 in the processing of step S94. The remaining processing of steps S91 to S93 is basically similar to the processing of steps S31 to S33 shown in FIG. 9, respectively, and a detailed description thereof is thus omitted to avoid redundancy.

In step S91, the control unit 66 determines whether or not a change in the line of sight has occurred. If the control unit 66 is notified of the time of a change in the user's line of sight by the determination unit 67, it is determined in step S91 that a change in the line of sight has occurred, and the process proceeds to step S92.

In step S92, the control unit 66 determines whether or not the line of sight has been changed to the screen of the display device 31 on the basis of the ID number of the line-of-sight destination notified by the determination unit 67. If there is a match between the ID number of the line-of-sight destination notified by the determination unit 67 and the ID number of the display device 31 obtained in step S71 shown in FIG. 14, it is determined in step S92 that the line of sight has been changed to the screen of the display device 31, and the process proceeds to step S93.

In step S93, the control unit 66 determines whether or not the memory 62 is in a protected mode. If it is determined that the memory 62 is not in the protected mode, i.e., the protected mode of the memory 62 has been released, the process proceeds to step S94.

In step S94, the control unit 66 turns on a memory-write flag for the memory 62. Specifically, the control unit 66 sets a write destination pointer to a start address of the memory 62 for image recording, and starts the recording of the input image signal. Then, the process returns to step S73 shown in FIG. 14 and proceeds to step S74.

If it is determined in step S91 that no change in the line of sight has occurred, or if it is determined in step S92 that the line of sight has not been changed to the screen of the display device 31, or if it is determined in step S93 that the memory 62 is in the protected mode, the process also returns to step S73 shown in FIG. 14 and proceeds to step S74.

Figure 16:
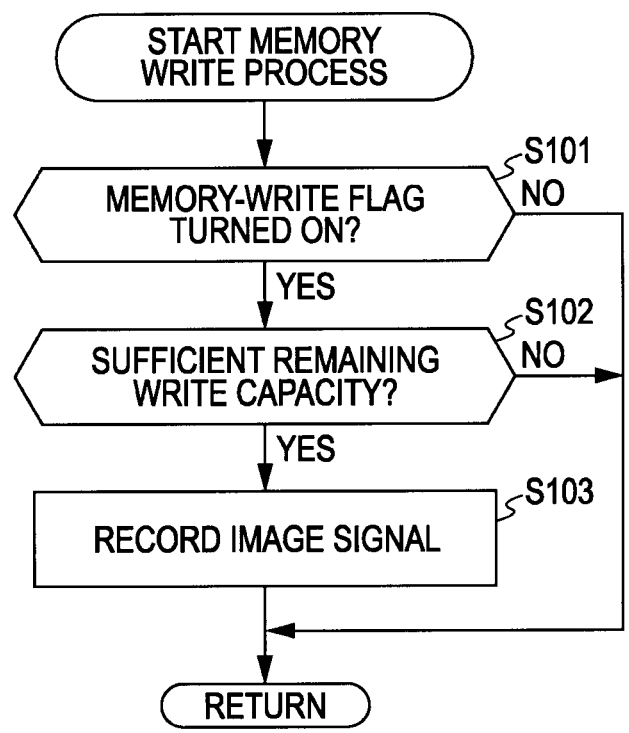
FIG. 16 is a flowchart showing a memory write process in step S74 shown in FIG. 14.

Referring back to FIG. 14, in step S74, the memory 62 performs a memory write process according to the memory control process in step S73. The memory write process will be described with reference to a flowchart shown in FIG. 16.

In step S101, the memory 62 determines whether or not the memory-write flag is turned on. If it is determined that the memory-write flag is turned on, the process proceeds to step S102. In step S102, the memory 62 determines whether or not a sufficient write capacity remains.

If it is determined in step S102 that a sufficient write capacity remains, in step S103, the memory 62 records the input image signal. Therefore, image signals occurring during a period of time after a start instruction of recording is given in step S94 shown in FIG. 15 until a stop instruction of recording is given in step S112 shown in FIG. 17, as described below, are recorded as a memory moving image.

In general, when the memory-write flag is turned on, the memory is not in the protected mode, and the previous moving image is overwritten. However, if the time until a stop instruction of recording is given is significantly long, or if no memo command is received and no stop instruction of recording is given, the recording of a moving image is stopped when the write capacity has exhausted.

If it is determined in step S101 that the memory-write flag is turned off, or if it is determined in step S102 that no sufficient write capacity remains, the process skips step S103. Then, the process returns to step S74 shown in FIG. 14 and proceeds to step S75. In this case, no image signals are recorded.

Referring back to FIG. 14, in step S75, the control unit 66 determines whether or not a command has been received from the remote controller 22. If it is determined that a command has been received from the remote controller 22, in step S76, it is determined whether or not the received command is a screen selection command.

If it is determined in step S76 that the received command is a screen selection command, in step S77, the control unit 66 changes the selected mode of the screen of the display device 31 according to the screen selection command. Specifically, if the received command is a screen selection command for selecting the screen of the display device 31, the control unit 66 changes the screen to the selected mode. If the received command is a screen selection command for selecting the screen of any other display device 31 and if the screen of the display device 31 is in the selected mode, the control unit 66 releases the selected mode. Then, the process returns to step S75, and the subsequent processing is repeated.

If it is determined in step S76 that the received command is not a screen selection command, in step S78, the control unit 66 determines whether or not the screen of the display device 31 is in the selected mode. If it is determined in step S78 that the screen is in the selected mode, in step S79, the control unit 66 resets the value of the counter.

Figure 17:
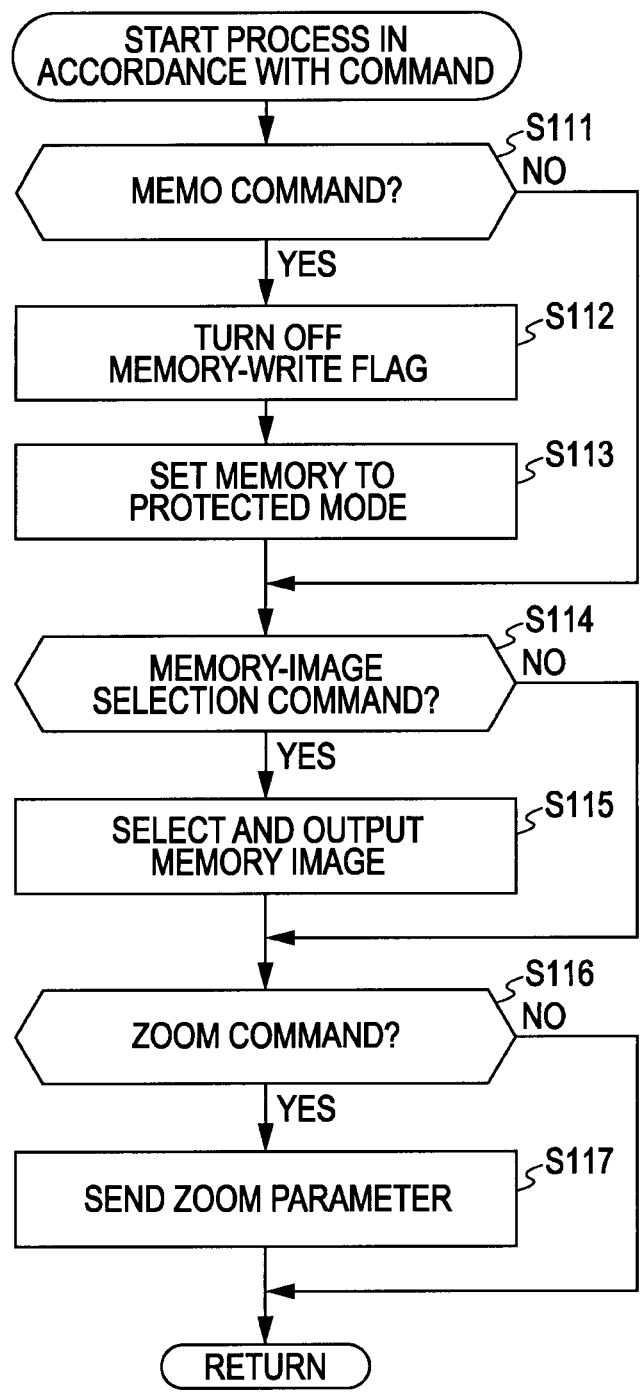
FIG. 17 is a flowchart showing a process in accordance with a command in step S80 shown in FIG. 14.

In step S80, the control unit 66 performs a process in accordance with the command. The process in accordance with the command will be described with reference to a flowchart shown in FIG. 17. In FIG. 17, the processing of steps S111, S113, S114, S116, and S117 is basically similar to the processing of steps S41, S43, S45, S47, and S48 shown in FIG. 10, respectively, and a detailed description thereof is thus omitted to avoid redundancy.

In step S111, the control unit 66 determines whether or not the received command is a memo command. If it is determined that the received command is a memo command, in step S112, the control unit 66 turns off the memory-write flag. Specifically, the control unit 66 stops the recording in the memory 62 instructed to be started in step S94 shown in FIG. 15.

In step S113, the control unit 66 sets the memory 62 to the protected mode. Thus, the moving image stored in the memory 62 is prohibited from being overwritten until it is determined that the user's operation of the remote controller 22 is not performed for a predetermined period of time or longer. A moving image recorded if no memo command is received is not prohibited from being overwritten, and is therefore overwritten next time the user changes his/her line of sight.

If it is determined in step S111 that the received command is not a memo command, the process skips steps S112 and S113, and proceeds to step S114. In step S114, the control unit 66 determines whether or not the received command is a memory-image selection command. If it is determined that the received command is a memory-image selection command, in step S115, the control unit 66 controls the output selection unit 63 so as to read the image signal of the memory image in accordance with the command from the memory moving image.

Figure 18:
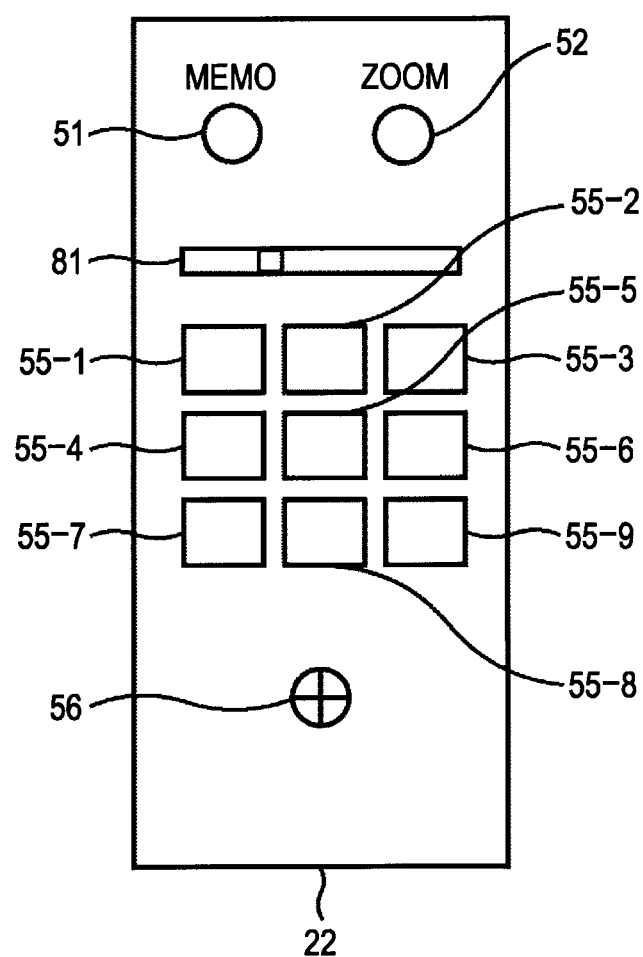
FIG. 18 is an external view showing another example of the structure of the remote controller shown in FIG. 2 in the case shown in FIG. 13.

As shown in FIG. 18, the remote controller 22 may be configured to record a moving image. In this case, the remote controller 22 includes on a front surface thereof, a memo button 51, a zoom button 52, screen selection buttons 55-1 to 55-9, and an operating stick 56, as in the remote controller 22 shown in FIG. 3. The remote controller 22 shown in FIG. 18 further includes on the front surface thereof, in place of the Fn1 button 53 and Fn2 button 54 shown in FIG. 3, an image selection slider 81 for selecting a desired memory image (frame) from the memory moving image.

In the remote controller 22 shown in FIG. 18, after the screen selection button 55 is selected, when the user moves a knob on the image selection slider 81 to the right or left, an image selection command for selecting a memory image at a position in the memory moving image corresponding to the position of the knob on the image selection slider 81 is generated and transmitted.

Therefore, in the case of a memory-image selection command generated by moving the image selection slider 81, the output selection unit 63 selects an image signal of a memory image located at a position, specified by the command, in the memory moving image stored in the memory 62 to read the image signal of the selected memory image, and outputs the read image signal to the image processing unit 64.

The image signal subjected to image processing by the image processing unit 64 is output to the display 65. The display 65 displays a memory image corresponding to the image signal output from the image processing unit 64.

If it is determined in step S114 that the received command is not a memory-image selection command, the process skips step S115 and proceeds to step S116. In step S116, the control unit 66 determines whether or not the received command is a zoom command. If it is determined that the received command is a zoom command, the process proceeds to step S117.

In step S117, the control unit 66 sends zoom parameters (such as zoom magnification and zoom range) in accordance with the command to the image processing unit 64, and controls the image processing unit 64 so as to perform image zoom processing on the image signal. Specifically, the image processing unit 64 performs predetermined image processing on the image signal output from the output selection unit 63, and performs image zoom processing on the image signal on the basis of the zoom parameters sent from the control unit 66. The resulting image signal is output to the display 65, and the display 65 displays an image corresponding to the image signal subjected to the zoom processing on the basis of the zoom parameters.

If it is determined in step S116 that the received command is not a zoom command, the process skips step S117, and returns to step S80 shown in FIG. 14. Then, the process further returns to step S72, and the subsequent processing is repeated.

If it is determined in step S75 shown in FIG. 14 that no command has been received from the remote controller 22, or if it is determined in step S78 that the screen of the display device 31 is not in the selected mode, the process proceeds to step S81. Since no command directed to the display device 31 of the display device 31 has been received, in step S81, the control unit 66 increments the value of the internal counter.

In step S82, the control unit 66 determines whether or not the value of the counter is equal to or more than a predetermined threshold value. If it is determined that the value of the counter is equal to or more than the predetermined threshold value, i.e., when a period of time not less than the threshold value has elapsed since the display device 31 received the last command, in step S83, the control unit 66 releases the protected mode of the memory 62. Therefore, a write to the memory 62 is permitted in accordance with the line-of-sight detection result data or the memo command.

If it is determined in step S82 that the value of the counter is less than the threshold value, the process skips step S83 and returns to step S72, and the subsequent processing is repeated.

Accordingly, a predetermined period of time after the moment when the user moves his/her line of sight is estimated to be a period of time in which information of which the user desires to make a memo is shown. If a change in the user's line of sight has occurred, a moving image displayed on the line-of-sight destination is recorded in the memory 62. Therefore, for example, even if the user hesitates to operate the remote controller 22, failure to catch an object of interest can further be avoided.

Figure 19:
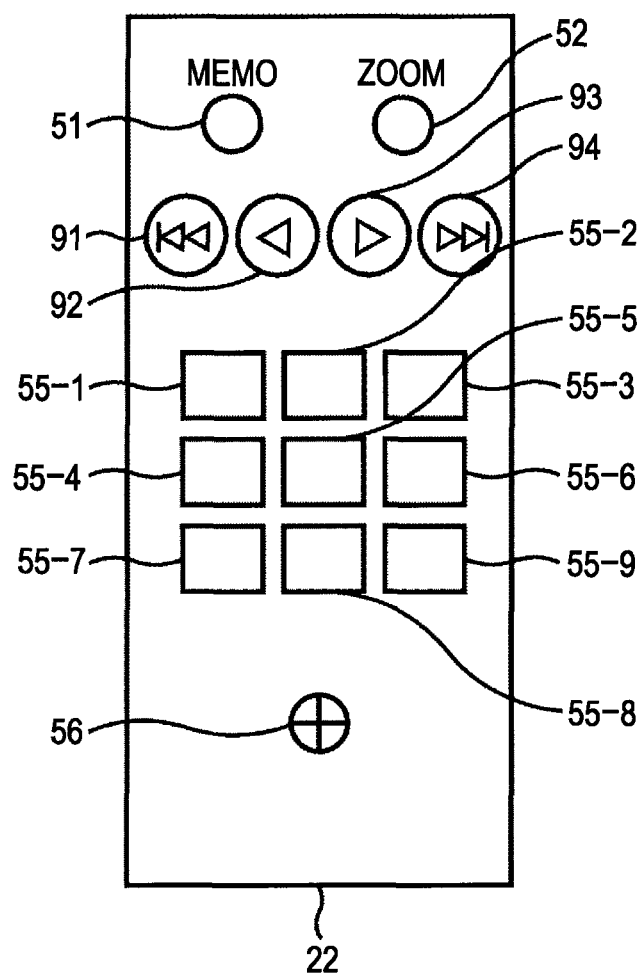
FIG. 19 is an external view showing another example of the structure of the remote controller shown in FIG. 2 in the case shown in FIG. 13.

FIG. 19 is an external view showing another example of the structure of the remote controller 22 shown in FIG. 18. The remote controller 22 shown in FIG. 19 includes on a front surface thereof, in place of the image selection slider 81, a jump-to-first button 91 for returning to the first frame, a return-to-previous button 92 for returning to the previous frame, a go-to-next button 93 for proceeding to the next frame, and a jump-to-last button 94 for jumping to the last frame, which is different from the remote controller 22 shown in FIG. 18. The remote controller 22 shown in FIG. 19 further includes on the front surface thereof a memo button 51, a zoom button 52, screen selection buttons 55-1 to 55-9, and an operating stick 56, as in the remote controller 22 shown in FIG. 18.

In the remote controller 22 shown in FIG. 19, after the screen selection button 55 is selected, when the user presses the jump-to-first button 91, the return-to-previous button 92, the go-to-next button 93, or the jump-to-last button 94, an image selection command for selecting a memory image (frame) associated with the pressed button from a predetermined memory image in the memory moving image is generated and transmitted.

For example, when the user presses the go-to-next button 93, the output selection unit 63 selects an image signal of a memory image (frame) next to the predetermined memory image of the memory moving image stored in the memory 62 to read the image signal of the selected memory image, and outputs the read image signal to the image processing unit 64. Therefore, the display 65 displays a memory image corresponding to the image signal output from the image processing unit 64.

Figure 20:
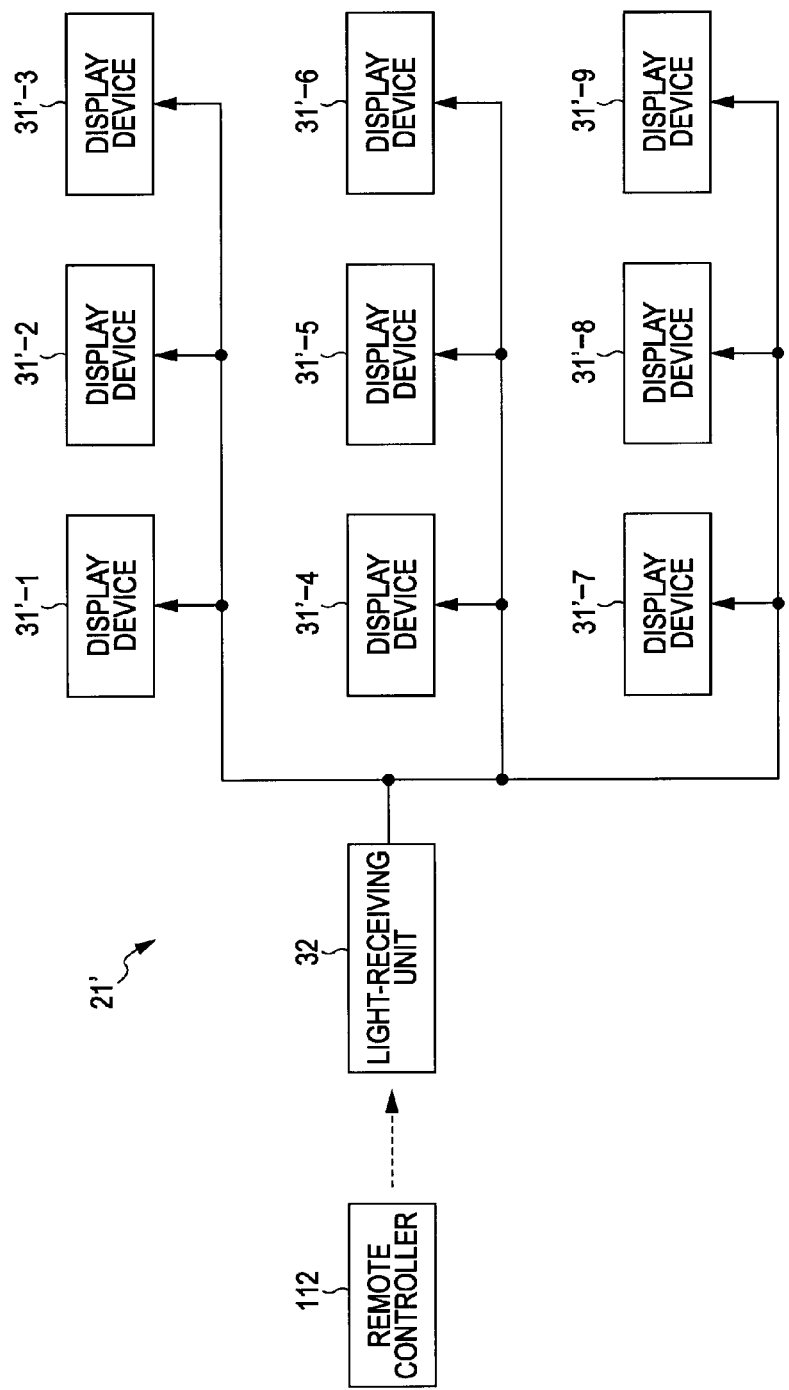
FIG. 20 is a block diagram showing an example of the structure of a multi-display system according to a second embodiment of the present invention.

FIG. 20 is a diagram showing a structure of a multi-display system according to a second embodiment of the present invention. The multi-display system shown in FIG. 20 is different from the multi-display system shown in FIG. 2 in that the multi-display system shown in FIG. 20 includes a remote controller 112 in place of the remote controller 22 and does not include the line-of-sight detection apparatus 23. As in the multi-display system shown in FIG. 2, the multi-display system shown in FIG. 20 further includes a multi-display apparatus 21' including a plurality of display devices 31'-1 to 31'-9 (the display devices 31'-1 to 31'-9 are hereinafter referred to collectively as "display devices 31'" or individually as a "display device 31'" unless separately specified).

In the multi-display system shown in FIG. 20, when a movement (a change in acceleration) of the remote controller 112 caused by a user's operation is detected instead of a change in the user's line of sight on the basis of the line-of-sight detection result data from the line-of-sight detection apparatus 23, each of the display devices 31'-1 to 31'-9 stores an image currently displayed thereon. The movement of the remote controller 112 is detected when the light-receiving unit 32 receives an event-determination result flag from the remote controller 112 and supplies the flag to the display devices 31'.

The remote controller 112 includes an operation unit 71 having, as in the remote controller 22 shown in FIG. 3, the memo button 51, zoom button 52, Fn1 button 53, Fn2 button 54, screen selection button 55, and operating stick 56 shown in FIG. 3, and an acceleration sensor 121 (see FIG. 22, as described below). Upon detecting, in addition to the commands described above with reference to FIG. 3, a rapid change in acceleration from a result of an output value of the acceleration sensor 121 converted from analog to digital (AD) form, the remote controller 112 generates an event-determination result flag, and emits light to send the generated event-determination result flag in the form of a predetermined light signal.

The remote controller 112 may transmit an event-determination result flag via infrared communication for use in normal command transmission, or using a wireless local area network (LAN), Bluetooth™, or the like. The transmission via directional infrared communication is more robust because an event-determination result causing noise is less likely to be received in the operation of the remote controller 112 that is not directed to the front of the multi-display apparatus 21'.

Figure 21:
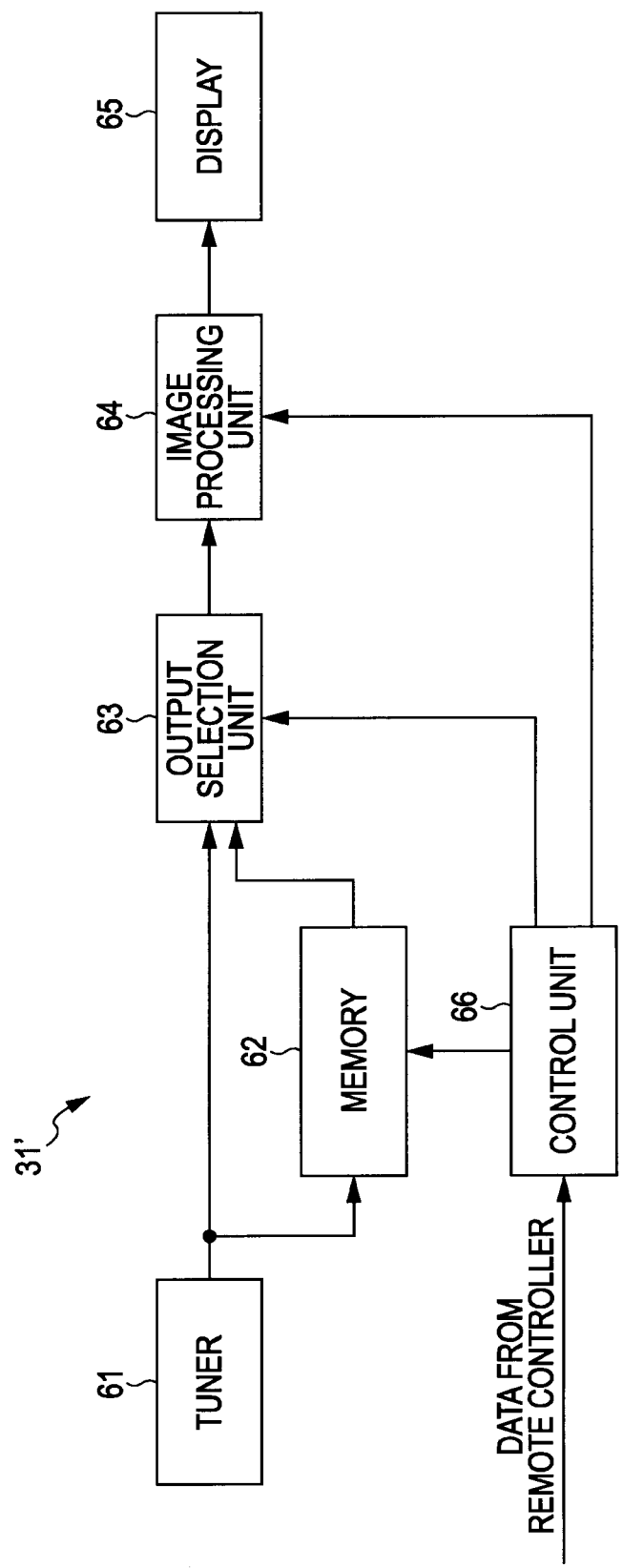
FIG. 21 is a block diagram showing an example of the structure of a display device shown in FIG. 20.

FIG. 21 is a diagram showing an example of the electrical structure of the display device 31' shown in FIG. 20. The display device 31' shown in FIG. 21 is different from the display device 31 shown in FIG. 4 in that the determination unit 67 is not provided. As in the display device 31 shown in FIG. 4, the display device 31' includes a tuner 61, a memory 62, an output selection unit 63, an image processing unit 64, a display 65, and a control unit 66.

Upon receiving data from the remote controller 112 via the light-receiving unit 32, the control unit 66 shown in FIG. 21 determines whether or not the received data is an event-determination result flag. If the received data is an event-determination result flag, i.e., if the remote controller 112 detects a rapid change in acceleration, the control unit 66 controls to update the memory image #1 stored in the memory 62. If the data received from the remote controller 112 is a command, the control unit 66 updates the memory image #2 stored in the memory 62, selects an output image, or control zoom parameters, etc., according to the command in a manner described above with reference to FIG. 4.

Figure 22:
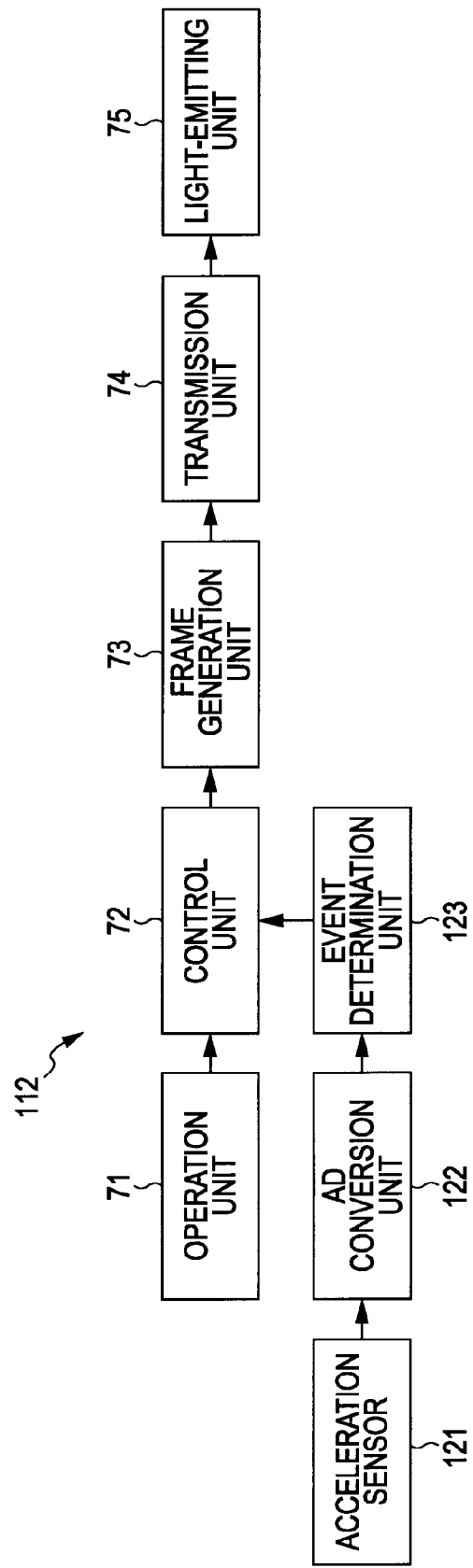
FIG. 22 is a block diagram showing an example of the electrical structure of a remote controller shown in FIG. 20.

FIG. 22 is a diagram showing an example of the electrical structure of the remote controller 112 shown in FIG. 21. The remote controller 112 shown in FIG. 22 is different from the remote controller 22 shown in FIG. 5 in that an acceleration sensor 121, an AD conversion unit 122, and an event determination unit 123 are additionally provided. As in the remote controller 22 shown in FIG. 5, the remote controller 112 shown in FIG. 22 further includes an operation unit 71, a control unit 72, a frame generation unit 73, a transmission unit 74, and a light-emitting unit 75. In the multi-display system shown in FIG. 20, therefore, the determination unit 67 included in the display device 31 in the multi-display system shown in FIG. 2 is included in the remote controller 112 as the event determination unit 123.

As well as outputting a generated command to the frame generation unit 73, the control unit 72 shown in FIG. 22 generates an event-determination result flag when an event-detection flag from the event determination unit 123 is turned on, and outputs the event-determination result flag to the frame generation unit 73.

The acceleration sensor 121 detects an acceleration of the remote controller 112 caused by, for example, the remote controller 112 held by the user, and outputs acceleration-sensor data to the AD conversion unit 122. The AD conversion unit 122 converts the output value from the acceleration sensor 121 (acceleration-sensor data) from analog to digital (AD) form, and outputs the AD-converted acceleration-sensor data to the event determination unit 123.

Upon detecting a rapid change in acceleration from the AD-converted acceleration-sensor data, the event determination unit 123 turns on an event-detection flag, and outputs the turned on event-detection flag to the control unit 72. If no rapid change in acceleration is detected, the event-detection flag is turned off, and the turned off event-detection flag is output to the control unit 72.

A process for recording an image using an event-determination result flag will be described with reference to FIGS. 23 and 24.

In an upper portion of FIG. 23, images G3' displayed on the display device 31'-3 (hereinafter also referred to as "screens G3' of the display device 31'-3") at times T1 and T2 (time T1<time T2) are illustrated.

Figure 23:
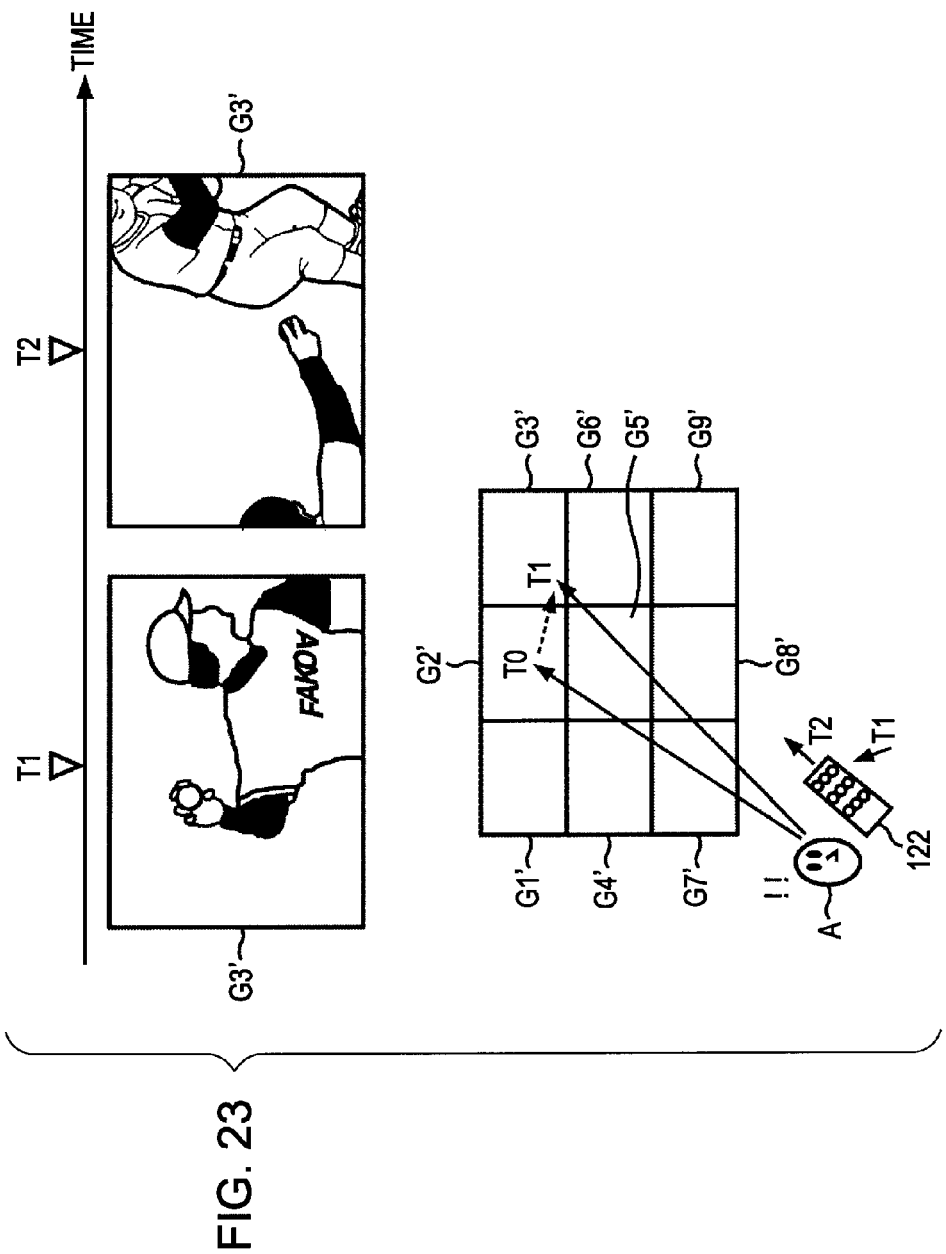
FIG. 23 is a diagram showing a process for recording an image using an event-determination result flag.
Figure 24:
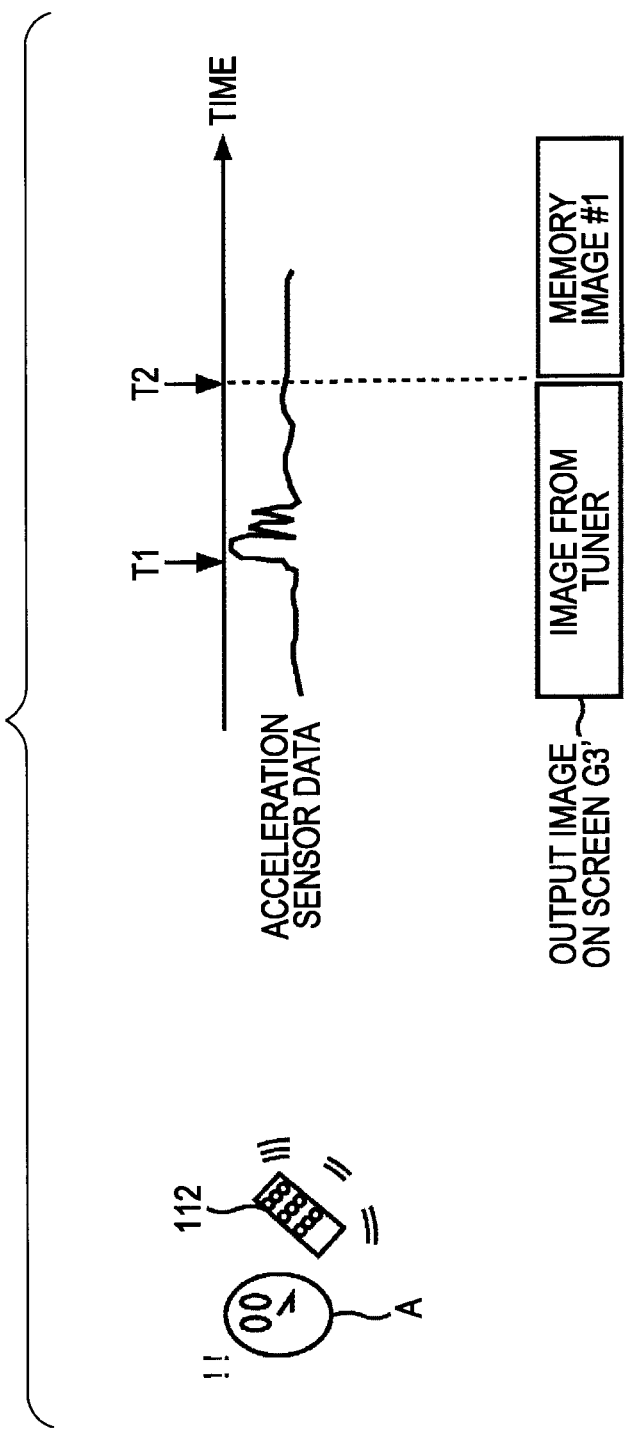
FIG. 24 is a diagram showing the process for recording an image using an event-determination result flag.

As shown in a lower portion of FIG. 23, at a time T0 (time T0<time T1), a user A views a screen G2' of the display device 31'-2 among screens G1' to G9' of the display devices 31'-1 to 31'-9. At the time T1, the user A moves his/her line of sight to the screen G3' of the display device 31'-3. At the moment of the time T1 when the user A changes his/her line of sight from the screen G2' to the screen G3', the user A notices the presence of an object of interest (e.g., in the example shown in FIG. 23, as in the example shown in FIG. 6, the pitcher's grip before throwing the ball when the pitcher cocks his arm) on the screen G3'.

When the user A notices an object of interest to make a memo, in many cases, he/she holds the remote controller 112 and takes an action (e.g., to move his/her finger) on the held remote controller 112. For example, to record the object on the screen G3', at the time T1 when the user A notices the object of interest on the screen G3', the user A holds the remote controller 112 and presses the screen selection button 55-3 on the front surface of the remote controller 112 to select the screen G3' of the display device 31'-3. Then, at the time T2, the user A presses the memo button 51. However, as described above with reference to FIG. 6, the information on the screen G3' has already changed at the moment of the time T2 when the user A presses the memo button 51, and the user A may fail to record the object displayed at the moment of the time T1 on the screen G3'. Also in the example shown in FIG. 23, the screen G3' displayed at the time T2 shows an image of a moment when the pitcher throws the ball.

Therefore, the acceleration sensor 121 of the remote controller 112 detects a movement of the main body of the remote controller 112 or a movement of the user's finger, and records an image displayed on the screen G3' at the moment when such a movement is detected (i.e., the screen G3' displayed at the time T1) in the memory 62 in advance. Then, the image recorded in the memory 62 is used as the screen G3' displayed at the time T2 when the user A actually presses the memo button 51.

This feature will be specifically described with reference to FIG. 24. In the example shown in FIG. 24, a change in the acceleration-sensor data for the remote controller 112 over time, and a change in the output image displayed on the screen G3' over time are illustrated.

The display devices 31'-1 to 31'-9 monitor an incoming event-detection flag from the remote controller 112. At the time T1 when a change in acceleration of the remote controller 112 occurs, the display devices 31'-1 to 31'-9 store information displayed on the screens G1' to G9' in the memories 62 as memory images #1 on the basis of the monitored event-detection flag. In this case, unlike a change in the line of sight, which screen the user A is viewing is not determined by a change in acceleration of the remote controller 112. Therefore, images displayed on all the screens G1' to G9' at the time of the change in acceleration are stored as memory images #1 in the memories 62 of the display devices 31'.

At the time T2 when the user A actually presses the memo button 51 for the screen G3', the display device 31'-3 stores the information displayed at the time T2 on the screen G3' in the memory 62 as a memory image #2. Further, as indicated by the output image on the screen G3', the display device 31'-3 switches an output image on the screen G3' from the image from the tuner 61 to the memory image #1. In the second embodiment, as in the first embodiment, a presetting may be performed so as to switch an output image on the screen G3' to the memory image #2 instead of the memory image #1.

Accordingly, the moment when the user A moves the remote controller 112 is estimated to be the moment when the user A desires to make a memo, and an image displayed when a rapid change in acceleration of the remote controller 112 occurs is recorded. Therefore, for example, even if the user A hesitates to operate the remote controller 112, failure to catch an object of interest can be avoided.

Figure 25:
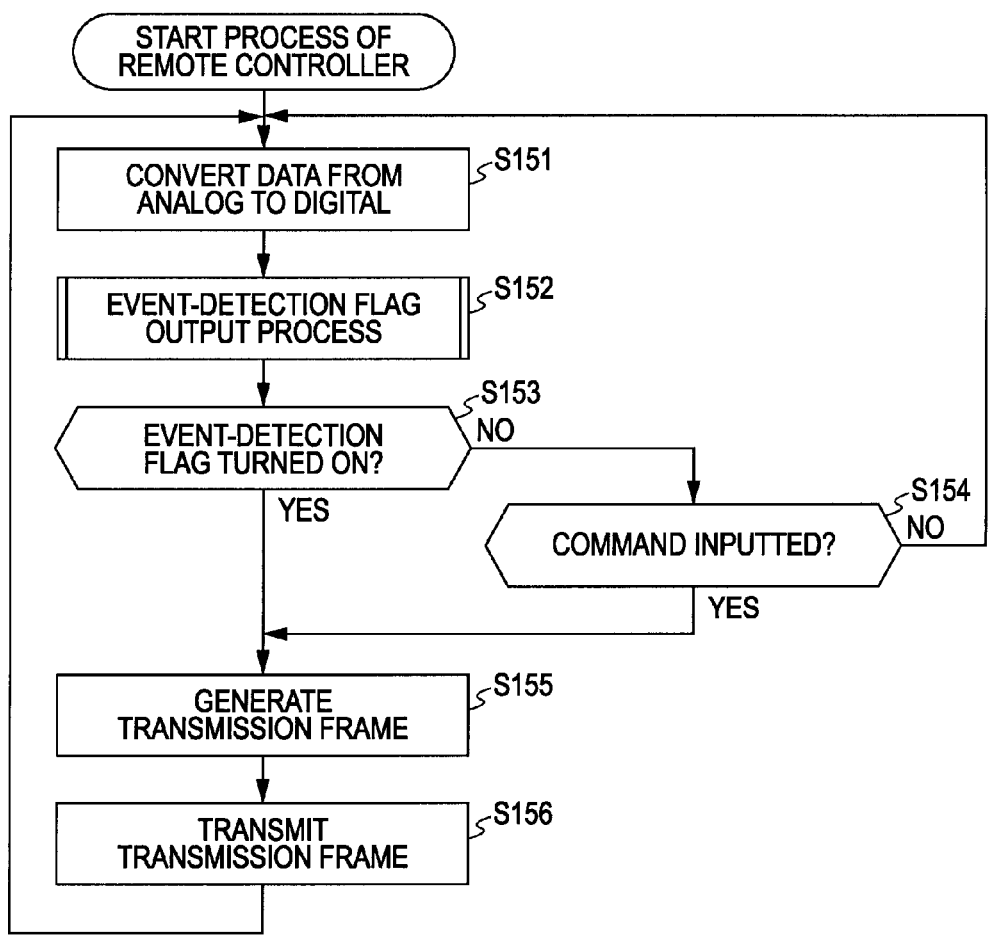
FIG. 25 is a flowchart showing a process of the remote controller shown in FIG. 20.

A process of the remote controller 112 shown in FIG. 20 will be described in detail with reference to a flowchart shown in FIG. 25. In FIG. 25, the processing of steps S154 to S156 is basically similar to the processing of steps S51 to S53 shown in FIG. 11, respectively, and a detailed description thereof is thus omitted to avoid redundancy.

The acceleration sensor 121 constantly detects the acceleration of the remote controller 112, and outputs acceleration-sensor data indicating the detected acceleration to the AD conversion unit 122.

In step S151, the AD conversion unit 122 converts the acceleration-sensor data output from the acceleration sensor 121 from analog to digital (AD) form, and outputs the AD-converted acceleration-sensor data to the event determination unit 123.

In step S152, the event determination unit 123 performs an event-detection flag output process. The event-detection flag output process will be described with reference to a flowchart shown in FIG. 26.

In step S171, the event determination unit 123 determines whether or not a rapid change in acceleration has been detected on the basis of the acceleration-sensor data output from the AD conversion unit 122. If it is determined that a rapid change in acceleration has been detected, the process proceeds to step S172, and the event determination unit 123 turns on the event-detection flag.

If it is determined in step S171 that no rapid change in acceleration has been detected, the process proceeds to step S173, and the event determination unit 123 turns off the event-detection flag.

In step S174, the event determination unit 123 outputs the turned on or off event-detection flag to the control unit 72. Then, the process returns to step S152 shown in FIG. 25, and proceeds to step S153.

Referring back to FIG. 25, in step S153, the control unit 72 determines whether or not the event-detection flag has been turned on. If it is determined that the event-detection flag has been turned on, the process skips step S154 and proceeds to step S155. In this case, the control unit 72 generates an event-determination result flag (which is turned on) on the basis of the event-detection flag, and outputs the generated event-determination result flag to the frame generation unit 73. If it is determined in step S153 that the event-detection flag has not been turned on, the process proceeds to step S154.

For example, when a user operates the operation unit 71 including, as shown in FIG. 3, the memo button 51, the zoom button 52, the Fn1 button 53, the Fn2 button 54, the screen selection button 55, and the operating stick 56, the control unit 72 generates a command recognizable by the display devices 31' on the basis of the operation signal input via the operation unit 71 in accordance with the operation using the operation unit 71, and outputs the generated command to the frame generation unit 73.

If the frame generation unit 73 determines in step S154 that a command has been input, the process proceeds to step S155. If it is determined in step S154 that no command has been input, the process returns to step S151, and the subsequent processing is repeated.

In step S155, the frame generation unit 73 generates a transmission frame based on data such as the event-determination result flag or command from the control unit 72, and transmits the generated transmission frame to the transmission unit 74. In step S156, the transmission unit 74 converts the transmission frame generated by the frame generation unit 73 into a light-emission signal to cause the light-emitting unit 75 to emit light.

Thus, the light-receiving unit 32 of the display device 31' receives the light from the remote controller 112, and transmits data corresponding to the received light (i.e., the command or event-determination result flag) to the display devices 31'.

Figure 27:
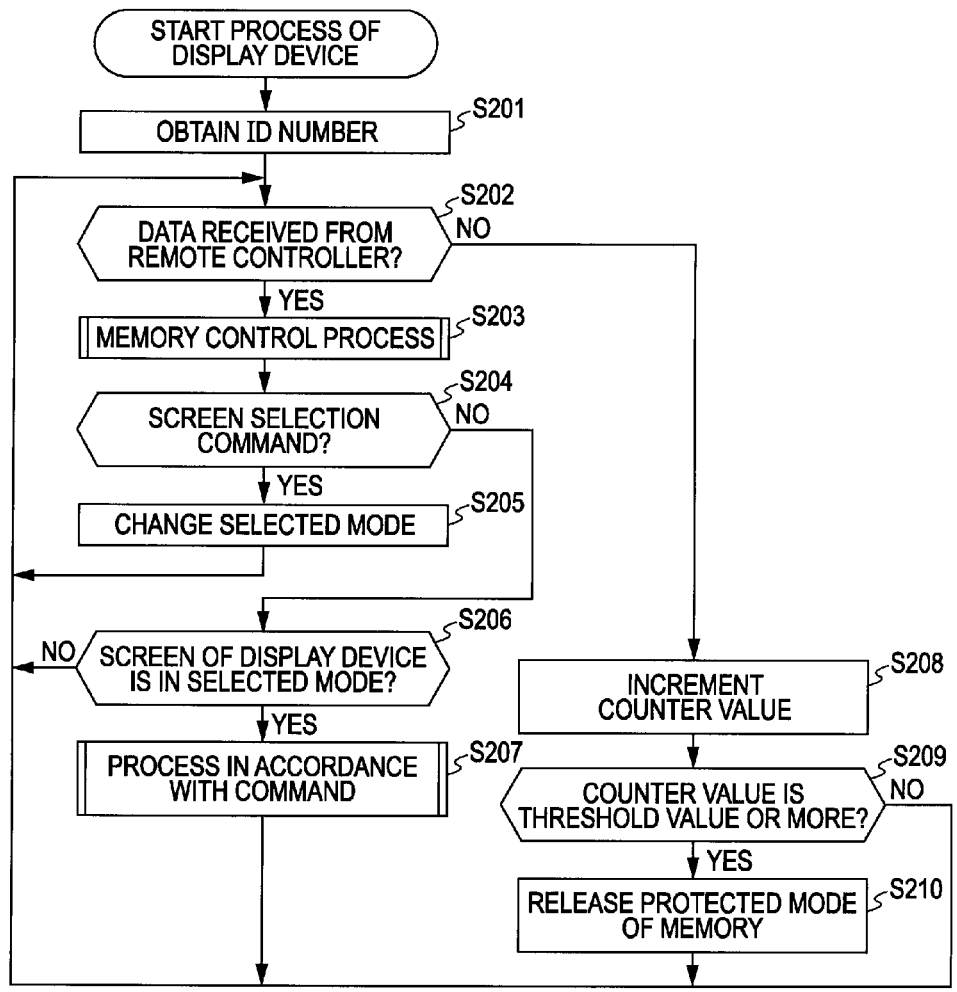
FIG. 27 is a flowchart showing a process of the display device shown in FIG. 20.

A process for recording an image using an event-determination result flag by the display device 31' corresponding to the process shown in FIG. 25 will be described in detail with reference to a flowchart shown in FIG. 27. In FIG. 27, the processing of steps S201 and S204 to S210 is basically similar to the processing of steps S11, S15 to S17, and S19 to S22 shown in FIG. 8, respectively, and a detailed description thereof is thus omitted to avoid redundancy.

In step S201, the control unit 66 checks a preset DIP switch or the like to obtain the ID number of the display device 31'. In step S202, the control unit 66 determines whether or not data has been received from the remote controller 112. If it is determined that data has been received from the remote controller 112, the process proceeds to step S203.

Figure 28:
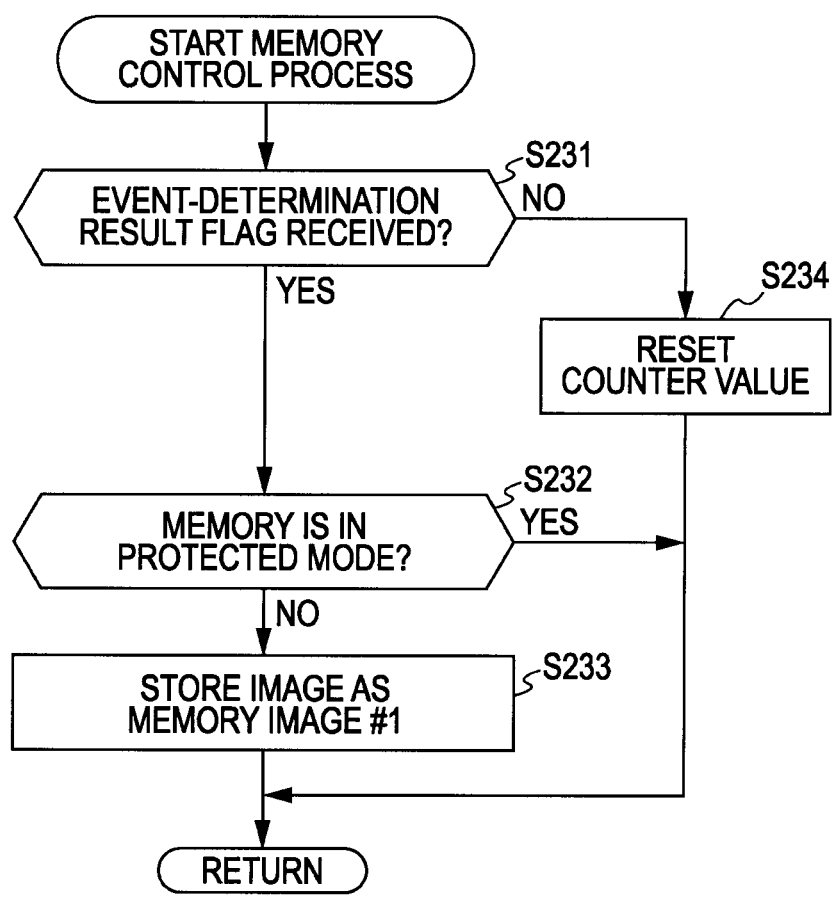
FIG. 28 is a flowchart showing a memory control process in step S203 shown in FIG. 27.

In step S203, the control unit 66 performs a memory control process. The memory control process will be described with reference to a flowchart shown in FIG. 28.

In step S231, the control unit 66 determines whether or not an event-determination result flag has been received. If the data received from the remote controller 112 in step S202 shown in FIG. 27 is an event-determination result flag, it is determined in step S231 that an event-determination result flag has been received, and the process proceeds to step S232. In step S232, the control unit 66 determines whether or not the memory 62 is in a protected mode. If it is determined that the memory 62 is not in the protected mode, i.e., the protected mode of the memory 62 has been released, the process proceeds to step S233.

In step S233, the control unit 66 stores the image of the image signal input to the memory 62 as a memory image #1. Specifically, the control unit 66 updates the memory image #1 stored in the memory 62 with an image of an image signal input to the memory 62 at the time of the reception of the event-determination result flag (in other words, at the time of the detected rapid change in acceleration) and output to the display 65. Then, the process returns to step S203 shown in FIG. 27, and proceeds to step S204.

If it is determined in step S231 that no event-determination result flag has been received, the process proceeds to step S234. That is, a command has been received. Then, in step S234, the control unit 66 resets the value of the internal counter. Then, the process returns to step S203 shown in FIG. 27, and proceeds to step S204. If it is determined in step S232 that the memory 62 is not in the protected mode, the process also returns to step S203 shown in FIG. 27, and proceeds to step S204.

Referring back to FIG. 27, in step S204, the control unit 66 determines whether or not the received command is a screen selection command. If it is determined in step S204 that the received command is a screen selection command, in step S205, the control unit 66 changes the selected mode of the screen of the display device 31 according to the screen selection command. Then, the process returns to step S202, and the subsequent processing is repeated.

If it is determined in step S204 that the received command is not a screen selection command, in step S206, the control unit 66 determines whether or not the screen of the display device 31 is in the selected mode. If it is determined in step S206 that the screen is in the selected mode, in step S207, the control unit 66 performs a process in accordance with the command. The process in accordance with the command is similar to the process in accordance with the command described above with reference to FIG. 10, and a detailed description thereof is thus omitted to avoid redundancy.

That is, in step S207, if the received command is a memo command, the image of the image signal input to the memory 62 is stored as a memory image #2; the memory 62 is set to the protected mode; and the selection of the output selection unit 63 is controlled so as to read the image signal of the memory image #1 stored in the memory 62. Therefore, the display 65 displays the memory image #1 recorded at the time of the detected rapid change in acceleration.

If the received command is a memory-image selection command, the output selection unit 63 is controlled so as to read the image signal of the memory image in accordance with the command (the memory image #1 or the memory image #2). Therefore, the display 65 displays the memory image #1 recorded at the time of the detected rapid change in acceleration, or displays the memory image #2 recorded at the time of the reception of the memo command.

If the received command is a zoom command, zoom parameters (such as zoom magnification and zoom range) are transmitted, and the image processing unit 64 is controlled so as to perform image zoom processing on the image signal. Therefore, the display 65 displays an image corresponding to the image signal subjected to the zoom processing on the basis of the zoom parameters.

After the processing of step S207, the process returns to step S202, and the subsequent processing is repeated. If it is determined in step S206 that the screen is not in the selected mode, the process also returns to step S202, and the subsequent processing is repeated.

If it is determined in step S202 shown in FIG. 27 that no data has been received from the remote controller 112, the process proceeds to step S208. Since no data has been received from the remote controller 112, in step S208, the control unit 66 increments the value of the internal counter. In the example shown in FIG. 27, therefore, the value of the counter is not incremented even if an event-determination result flag has been received, but is not reset because no command has been received.

In step S209, the control unit 66 determines whether or not the value of the counter is equal to or more than a predetermined threshold value. If it is determined that the value of the counter is equal to or more than the predetermined threshold value, i.e., when a period of time not less than the threshold value has elapsed since the last command was received, in step S210, the control unit 66 releases the protected mode of the memory 62. Therefore, a write to the memory 62 is permitted in accordance with the event-determination result flag or the memo command.

If it is determined in step S209 that the value of the counter is less than the threshold value, the process skips step S210 and returns to step S202, and the subsequent processing is repeated.

Accordingly, the moment when the acceleration of the remote controller 112 rapidly changes is estimated to be the moment when the user desires to make a memo, and the screens of all the display devices 31' are recorded in the memories 62 when a rapid change in acceleration of the remote controller 112 occurs. Therefore, for example, even if the user hesitates to operate the remote controller 112, failure to catch an object of interest can be avoided.

Further, an image displayed on the display device 31' as a target to be operated (set to the selected mode) when a memo command is received is also recorded in the memory 62 separately from the images recorded when a rapid change in acceleration occurs. Therefore, an image displayed when the user successfully operates the remote controller 112 can also be obtained.

Further, if there exists a memory image stored in the memory 62 according to a memo command, the memory 62 is set to the protected mode so as to prevent the memory image from being overwritten. This can prevent the memory image stored in the memory 62 from being deleted by a user's accidental action such as moving his/her line of sight during the operation of the remote controller 112.

In the foregoing description, an event-determination result flag is delivered in response to a detection of the acceleration of the remote controller 112. Alternatively, a multi-display system may be configured to deliver an event-determination result flag by capturing the event of surprise from speech uttered by a speaker and determining the event from the voice of the speaker.

Figure 29:
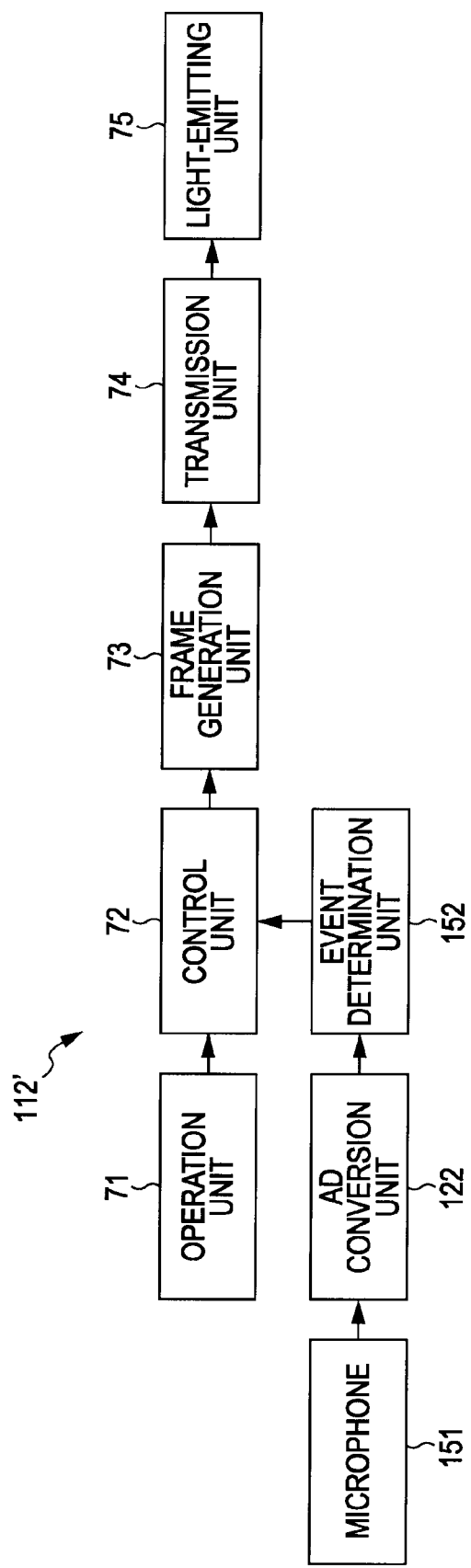
FIG. 29 is a block diagram showing another example of the display device shown in FIG. 20.

FIG. 29 is a diagram showing another example of the electrical structure of the remote controller 112 shown in FIG. 20 (hereinafter referred to as a "remote controller 112'"). The remote controller 112' shown in FIG. 29 includes a microphone 151 and an event determination unit 152 in place of the acceleration sensor 121 and the event determination unit 123 of the remote controller 112 shown in FIG. 22, respectively. As in remote controller 112 shown in FIG. 22, the remote controller 112' further includes an AD conversion unit 122, an operation unit 71, a control unit 72, a frame generation unit 73, a transmission unit 74, and a light-emitting unit 75.

The microphone 151 captures sound such as speech uttered by a speaker, and outputs an audio signal corresponding to the captured sound to the AD conversion unit 122. The AD conversion unit 122 converts the output value (audio signal) output from the microphone 151 from analog to digital (AD) form, and outputs the AD-converted audio data to the event determination unit 152.

Figure 30:
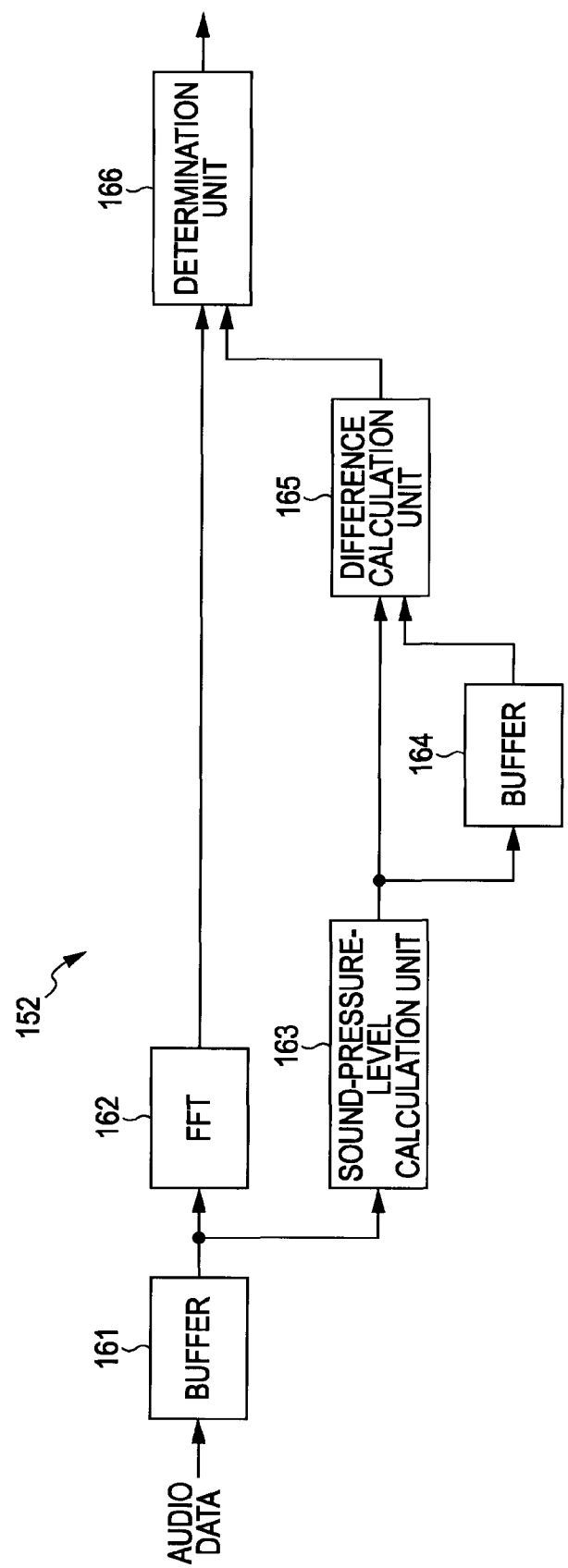
FIG. 30 is a block diagram showing an example of the structure of an event determination unit shown in FIG. 29.

As shown in FIG. 30, the event determination unit 152 shown in FIG. 29 includes a buffer 161, a fast Fourier transform (FFT) unit 162, a sound-pressure-level calculation unit 163, a buffer 164, a difference calculation unit 165, and a determination unit 166.

The buffer 161 stores audio samples obtained from the audio data input from the AD conversion unit 122. The FFT unit 162 applies an FFT to the data stored in the buffer 161 under the control of the determination unit 166 when the difference from the previous sample is large, and outputs a result of the FFT to the determination unit 166.

The sound-pressure-level calculation unit 163 calculates a sound pressure level using the data of the several samples stored in the buffer 161, and outputs data of the calculated sound pressure level to the buffer 164 and the difference calculation unit 165. In the buffer 164, data of the previous sound pressure level calculated by the sound-pressure-level calculation unit 163 is stored.

The difference calculation unit 165 calculates a difference between the sound pressure level output from the sound-pressure-level calculation unit 163 and the previous sound pressure level stored in the buffer 164, and outputs the difference to the determination unit 166.

The determination unit 166 determines the magnification of the difference output from the difference calculation unit 165. If the difference is large, the determination unit 166 controls the FFT unit 162 to apply an FFT to the data stored in the buffer 161, and turns on or off the event-detection flag according to a result of the FFT. Specifically, as a result of the FFT, if a power concentration in a low-frequency part occurs, the event-detection flag is turned on. If no power concentration in the low-frequency part occurs, the event-detection flag is turned off. The turned on or off event-detection flag is output to the control unit 72.

Figure 26:
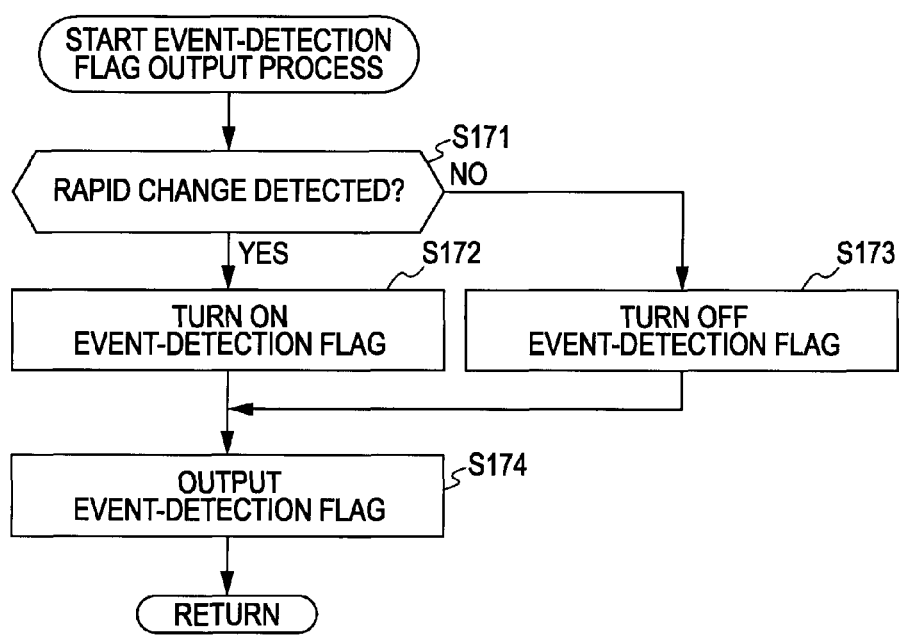
FIG. 26 is a flowchart showing an event-detection flag output process in step S152 shown in FIG. 25.
Figure 31:
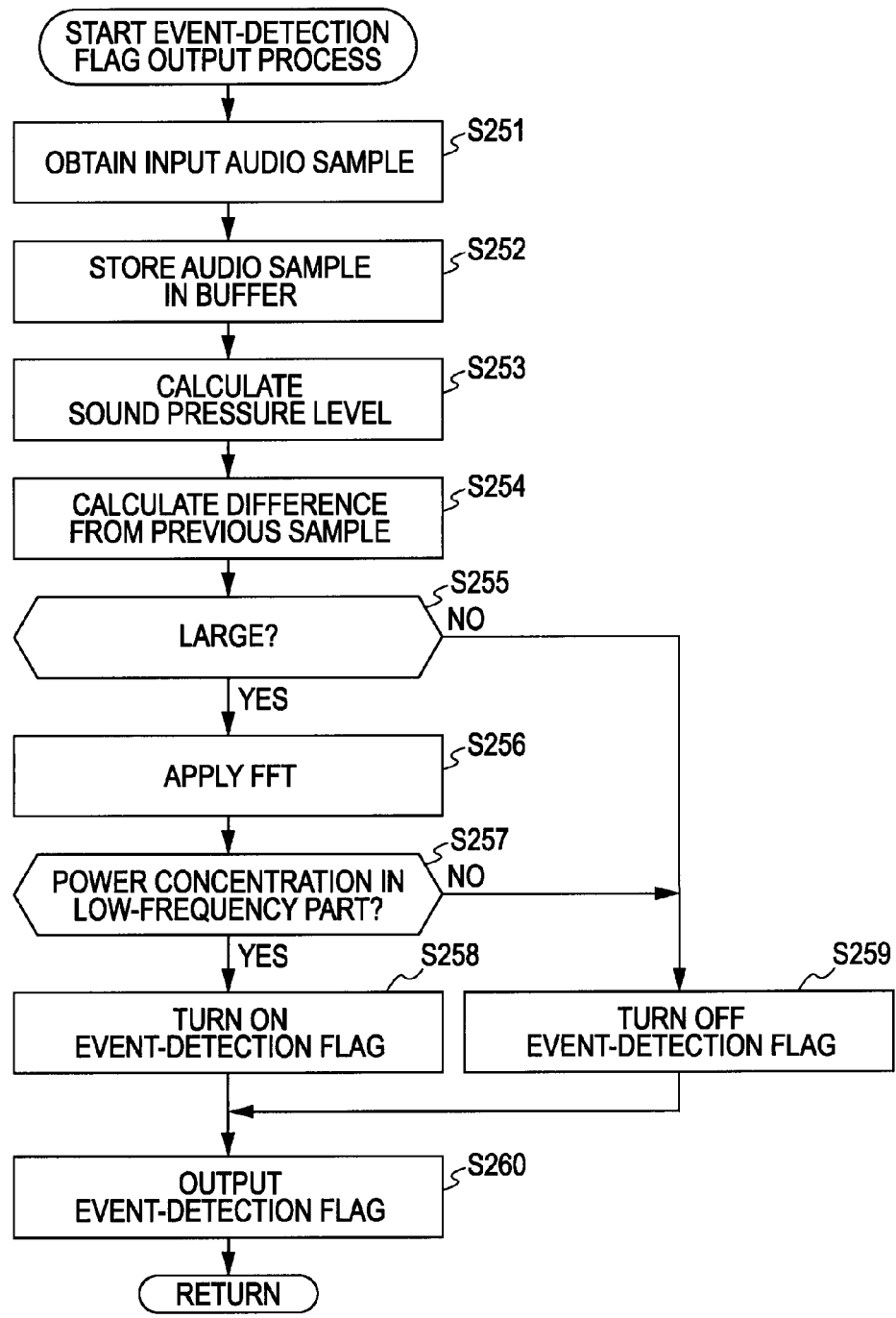
FIG. 31 is a flowchart showing another example of the event-detection flag output process in step S152 shown in FIG. 25.

A process of the remote controller 112' shown in FIG. 29 and the process of the remote controller 112 described above with reference to FIG. 25 are basically similar to each other, except for the event-detection flag output process in step S152 (i.e., the process shown in FIG. 26). Thus, only the event-detection flag output process in step S152, which is different from that shown FIG. 26, will be described with reference to a flowchart shown in FIG. 31.

In step S251, the buffer 161 obtains audio samples from the audio data input from the AD conversion unit 122. In step S252, the audio samples are stored in the buffer 161. In step S253, the sound-pressure-level calculation unit 163 calculates a sound pressure level using data of the several samples stored in the buffer 161, and outputs the data of the calculated sound pressure level to the buffer 164 and the difference calculation unit 165.

In step S254, the difference calculation unit 165 calculates a difference between the sound pressure level output from the sound-pressure-level calculation unit 163 and the previous sound pressure level stored in the buffer 164, and outputs the difference to the determination unit 166. In step S255, the determination unit 166 determines whether or not the difference output from the difference calculation unit 165 is large. If it is determined that the difference output from the difference calculation unit 165 is large, the process proceeds to step S256, and the determination unit 166 controls the FFT unit 162 to apply an FFT to the data stored in the buffer 161.

In step S257, the determination unit 166 determines whether or not a power concentration in the low-frequency part occurs as a result of the FFT by the FFT unit 162. If it is determined that a power concentration in the low-frequency part occurs, in step S258, the determination unit 166 turns on the event-detection flag.

If it is determined in step S255 that the difference output from the difference calculation unit 165 is not large, or if it is determined in step S257 that no power concentration in the low-frequency part occurs, the process proceeds to step S259, and the determination unit 166 turns off the event-detection flag.

In step S260, the determination unit 166 outputs the turned on or off event-detection flag to the control unit 72. Then, the process returns to step S152 shown in FIG. 25.

Accordingly, the remote controller 112' is provided with the microphone 151, and is configured such that the moment when a user utters an exclamation of surprise is estimated to be the moment when the user desires to make a memo and all screens are recorded in the memories 62 when a power concentration in the low-frequency part of the voice of the user occurs. Therefore, for example, even if the user hesitates to operate the remote controller 112', failure to catch an object of interest can be avoided.

In the foregoing description, the occurrence of a power concentration in the low-frequency part of the voice of the user is detected as the utterance of an exclamation of surprise from the user. Alternatively, voice with a certain volume level or a particular type of voice can be detected.

Accordingly, the moment when the user changes his/her line of sight, the moment when the remote controller 112' is moved, or the moment when the user utters speech is estimated to be the moment when the user desires to make a memo, and screens displayed when any of those events is detected are recorded in the memories 62. Therefore, for example, even if the user hesitates to operate the remote controller 112', failure to catch an object of interest can be avoided.

Further, no hard disk is used, resulting in no increase in cost.

While the recording of a moving image has been described above with reference to FIGS. 13 to 19 in the context of the multi-display system shown in FIG. 2, a moving image can be recorded using the multi-display system shown in FIG. 20. Also in the multi-display system shown in FIG. 20, a rapid change in acceleration or a power concentration in the low-frequency part of voice can be used as a trigger to record not only a still image but also a moving image.

Specifically, in the multi-display system shown in FIG. 2 or 20, the moment when the user changes his/her line of sight, or the moment when the remote controller 22 or 112 is moved, or a period of time after the user has uttered speech is estimated to be a moment or a period of time at or in which information of which the user desires to make a memo is shown, and a moving image displayed when such an event was detected is recorded in the memory 62. Therefore, for example, even if the user hesitates to operate a remote controller 22 or 112, failure to catch an object of interest can further be avoided.

In the foregoing description, any information such as line-of-sight detection data or a change in acceleration or speech detected in the remote controller 22 or 112 is used to estimate a moment when the user finds an object of interest, and an image is recorded, whereby failure to catch the object can be avoided. Alternatively, both line-of-sight detection data and a change in acceleration, or both line-of-sight detection data and a change in speech, or both a change in acceleration and a change in speech may be used. Alternatively, all those three types of information may be used.

In the foregoing description, images of different programs are displayed on display devices. In an embodiment of the present invention, as far as a plurality of images can be displayed on a multi-display apparatus, a single enlarged image may be displayed on at least two of the display devices, and images of different programs may be displayed on the other display devices.

The series of processes described above can be implemented by hardware or software.

When the series of processes are implemented by software, programs constituting the software is installed from a program recording medium onto a computer incorporated in special hardware, or a general-purpose personal computer capable of executing various functions with various programs installed thereon, or the like.

Figure 32:
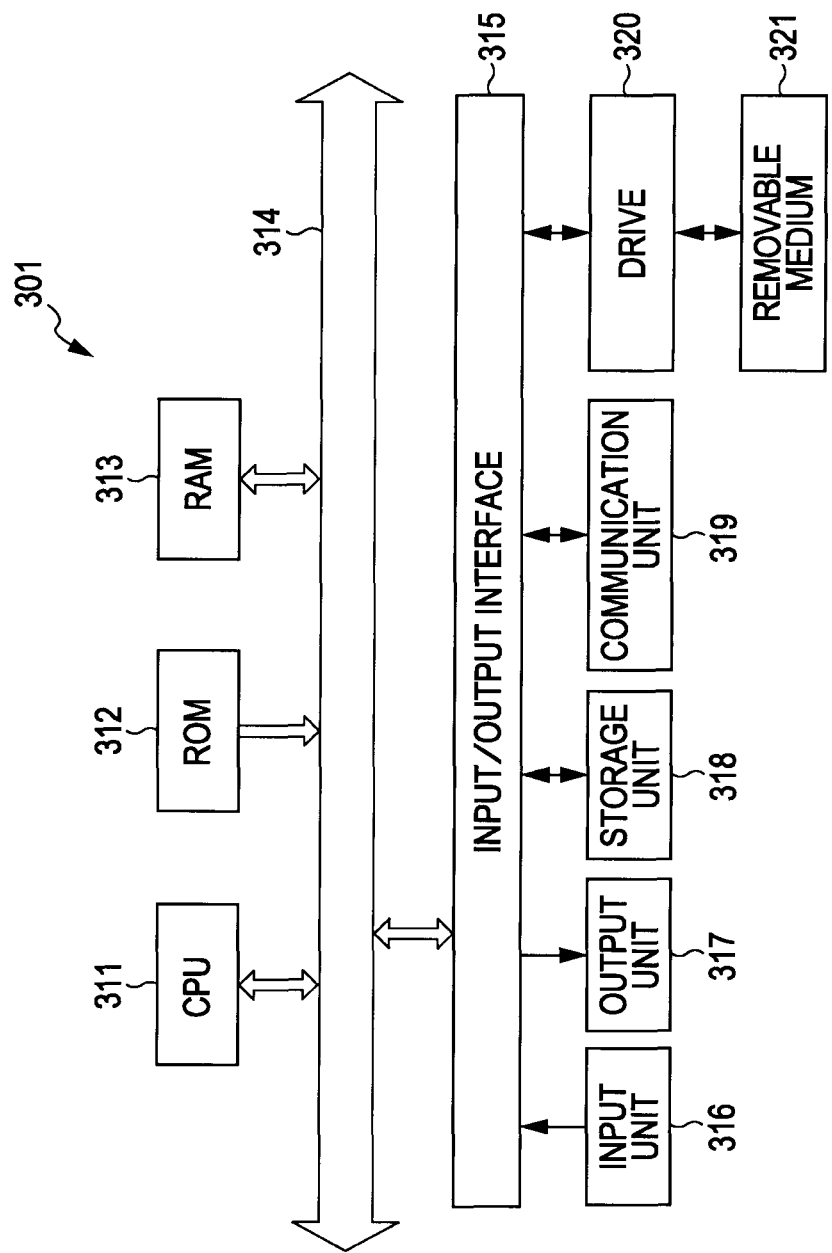
FIG. 32 is a block diagram showing an example of the structure of a personal computer according to an embodiment of the present invention.

FIG. 32 is a block diagram showing an example of the structure of a personal computer 301 that executes the series of processes described above according to a program. A central processing unit (CPU) 311 executes various processes according to programs stored in a read-only memory (ROM) 312 or a storage unit 318. A random access memory (RAM) 313 stores programs executed by the CPU 311, data, etc., as necessary. The CPU 311, the ROM 312, and the RAM 313 are connected to each other via a bus 314.

The CPU 311 is also connected to an input/output interface 315 via the bus 314. The input/output interface 315 is connected to an input unit 316 including the sensor 121 described above, a keyboard, a mouse, a microphone, etc., and to an output unit display 317 including a display, a loudspeaker, etc. The CPU 311 executes various processes according to instructions input from the input unit 316. The CPU 311 then outputs results of the processes to the output unit 317.

The storage unit 318 connected to the input/output interface 315 is formed of, for example, a hard disk, and stores programs executed by the CPU 311 and various data. A communication unit 319 communicates with an external apparatus via a network such as the Internet or a local area network.

Also, the programs may be obtained via the communication unit 319 and stored in the storage unit 318.

A drive 320 is further connected to the input/output interface 315. When a removable medium 321 such as a magnetic disk, an optical disk, a magneto-optical disk, or a semiconductor memory is mounted onto the drive 320, the drive 320 drives the removable medium 321 to obtain programs, data, etc., recorded thereon. The obtained programs, data etc., are transferred to and stored in the storage unit 318, as necessary.

As shown in FIG. 32, a program recording medium storing programs that is installed onto a computer so as to be executable by the computer may be formed of the removable medium 321, which is a package medium such as a magnetic disk (including a flexible disk), an optical disk (including a compact disc read-only memory (CD-ROM) and a digital versatile disc (DVD)), a magneto-optical disk, or a semiconductor memory, the ROM 312 in which programs are temporarily or persistently stored, a hard disk constituting the storage unit 318, or the like. The programs can be stored in the program recording medium via the communication unit 319, which is an interface such as a router or a modem, as necessary, using wired or wireless communication medium such as a local area network, the Internet, or digital satellite broadcasting.

In this specification, steps defining the programs stored in the program recording medium may include processes that are executed in parallel or individually, as well as processes that are executed in the orders described herein.

In this specification, a system refers to the entirety of a plurality of devices.

Embodiments of the present invention are not limited to those described above, and a variety of modifications can be made without departing from the scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. A display control system for controlling display of images on a plurality of display means, the plurality of display means being arranged in an array, the display control system comprising:
   means for determining whether or not information of interest is being displayed on a first display means;
   means for controlling recording of a first image displayed on the first display means when the means for determining determines that the information of interest is being displayed on the first display means;
   means for stopping, in response to the user performing a recording operation, recording of the first image, starting recording of a second image displayed on the first display means when the user performed the recording operation;
   means for overwriting the recorded first image, in response to the means for determining that information of interest is being displayed on a second display means and in response to a predetermined period of time elapsing after starting recording of the first image without the user performing the recording operation, with a third image displayed on the second display means when the means for determining determines that the information of interest is being displayed on the second display means;
   wherein starting the recording of the second image and displaying the first image are performed simultaneously and in response to the recording operation, and
   wherein overwriting the recorded first image with the third image includes overwriting in memory the first image with the third image.

2. The display control system according to claim 1, further comprising a plurality of display control apparatuses each associated with each of the plurality of display means and controlling display of an image on each of the display means, each of the plurality of display control apparatuses including:
   the means for determining;
   the means for controlling recording of the first image;
   the means for stopping; and
   the means for overwriting.

3. The display control system according to claim 2, further comprising a line-of-sight detection apparatus that detects a line of sight of the user,
    wherein the means for determining of each of the plurality of display control apparatuses determines whether or not the information of interest is being displayed on a corresponding one of the display means on the basis of a detection result from the line-of-sight detection apparatus.

4. The display control system according to claim 3, wherein the means for controlling recording of the first image of each of the plurality of display control apparatuses controls the recording of the first image displayed on a corresponding one of the display means when the means for determining determines that the information of interest is being displayed on the corresponding one of the display means on the basis of the detection result from the line-of-sight detection apparatus.

5. The display control system according to claim 2, further comprising a remote controller that controls the plurality of display control apparatuses,
    wherein the remote controller includes acceleration detecting means for detecting an acceleration of the remote controller that is operated by the user, and
    the determining means of each of the plurality of display control apparatuses determines whether or not the information of interest is being displayed on one of the plurality of display means on the basis of a detection result from the acceleration detecting means.

6. The display control system according to claim 5, wherein the first recording control means of each of the plurality of display control apparatuses controls the recording of the first image displayed on the display means when the determining means determines that the information of interest is being displayed on one of the plurality of display means on the basis of the detection result from the acceleration detecting means.

7. The display control system according to claim 2, wherein the means for controlling recording of the first image of each of the plurality of display control apparatuses controls to start recording of a moving image comprising plural frames, starting from the first image, which corresponds to a first frame of the moving image, displayed on a corresponding display means, when the means for determining determines that the information of interest is being displayed on the corresponding display means, and
    the means for stopping recording of the first image stops the recording of the moving image at the second image, which corresponds to a last frame of the moving image, displayed on the corresponding one of the display means when the user performs the recording operation.

8. The display control system according to claim 1, further comprising the plurality of display means.

9. The display control system according to claim 2, further comprising a remote controller that controls the plurality of display control apparatuses,
    wherein the remote controller includes speech detecting means for detecting specific speech of the user, and
    the determining means of each of the plurality of display control apparatuses determines whether or not the information of interest is being displayed on one of the plurality of display means on the basis of a detection result from the speech detecting means.

10. The display control system according to claim 9, wherein the first recording control means of each of the plurality of display control apparatuses controls the recording of the first image displayed on the display means when the determining means determines that the information of interest is being displayed on one of the plurality of display means on the basis of the detection result from the speech detecting means.

11. A display control method for a display control system for controlling display of images on a plurality of display means, the plurality of display means being arranged in an array, the display control method comprising:
    determining whether or not information of interest is being displayed on the first display means;
    controlling recording of a first image displayed on the first display means when it is determined that the information of interest is being displayed on the first display means;
    in response to the user performing a recording operation, stopping recording of the first image and starting recording of a second image displayed on the first display means when the user performed the recording operation, and displaying the first image;
    overwriting the recorded first image, in response to a determination that information of interest is being displayed on a second display means and in response to a predetermined period of time elapsing after starting recording of the first image without the user performing the recording operation, with a third image displayed on the second display means when it is determined that the information of interest is being displayed on the second display means;
    wherein starting the recording of the second image and displaying the first image are performed simultaneously and in response to the recording operation, and
    wherein overwriting the recorded first image with the third image includes overwriting in memory the first image with the third image.

12. A display control apparatus in a display control system including a plurality of display control apparatuses, for controlling display of an image on display means associated with the display control apparatus from among a plurality of display means arranged in an array, the display control apparatus comprising:
    the display means for displaying an image corresponding to an image signal input to the display control apparatus;
    means for determining whether or not information of interest is being displayed on the display means;
    means for controlling recording of a first image displayed on the display means when the means for determining determines that the information of interest is being displayed on the display means;
    means for stopping, in response to the user performing a recording operation, recording of the first image and starting recording of a second image displayed on the display means when the user performed the recording operation;
    means for overwriting the recorded first image, in response to the means for determining that information of interest is being displayed on the display means and in response to a predetermined period of time elapsing after starting recording of the first image without the user performing the recording operation, with a third image displayed on the display means when the means for determining determines that the information of interest is being displayed on the display means;
    wherein starting the recording of the second image and displaying the first image are performed simultaneously and in response to the recording operation, and
    wherein overwriting the recorded first image with the third image includes overwriting in memory the first image with the third image.

13. A display control method for a display control apparatus in a display control system including a plurality of display control apparatuses, for controlling display of an image on display means associated with the display control apparatus from among a plurality of display means arranged in an array, the display control method comprising:
- determining whether or not information of interest is being displayed on the display means associated with the display control apparatus;
- controlling recording of a first image displayed on the display means associated with the display control apparatus when it is determined that the information of interest is being displayed on the display means associated with the display control apparatus;
- in response to the user performing a recording operation, stopping recording of the first image and starting recording of a second image displayed on the display means associated with the display control apparatus when the user performed the recording operation;
- overwriting the recorded first image, in response to a determination that information of interest is being displayed on the display means and in response to a predetermined period of time elapsing after starting recording of the first image without the user performing the recording operation, with a third image displayed on the display means when it is determined that the information of interest is being displayed on the display means;
- wherein starting the recording of the second image and displaying the first image are performed simultaneously and in response to the recording operation, and
- wherein overwriting the recorded first image with the third image includes overwriting in memory the first image with the third image.

14. A non-transitory computer-readable storage medium storing instructions thereon, which, when executed by a computer, cause the computer to perform a display control method for a display control apparatus in a display control system including a plurality of display control apparatuses to execute a process for controlling display of an image on display means associated with the display control apparatus from among a plurality of display means arranged in an array, the display control method comprising:
- determining whether or not information of interest is being displayed on the display means associated with the display control apparatus;
- controlling recording of a first image displayed on the display means associated with the display control apparatus when it is determined that the information of interest is being displayed on the display means associated with the display control apparatus;
- in response to the user performing a recording operation, stopping recording of the first image and starting recording of a second image displayed on the display means associated with the display control apparatus when the user performed the recording operation; and
- overwriting the recorded first image, in response to a determination that information of interest is being displayed on the display means and in response to a predetermined period of time elapsing after starting recording of the first image without the user performing the recording operation, with a third image displayed on the display means when it is determined that the information of interest is being displayed on the display means;
- wherein starting the recording of the second image and displaying the first image are performed simultaneously and in response to the recording operation, and
- wherein overwriting the recorded first image with the third image includes overwriting in memory the first image with the third image.

15. A display control system for controlling display of images on a plurality of displays, the plurality of displays being arranged in an array, the display control system comprising:
- circuitry configured to
- determine whether or not information of interest is being displayed on a first one of the displays;
- control recording of a first image displayed on the first one of the displays when it is determined that the information of interest is being displayed on the first one of the displays; and
- stop, in response to the user performing a recording operation, recording of the first image and start recording of a second image displayed on the first one of the displays when the user performed the recording operation;
- overwrite the recorded first image, in response to a determination that information of interest is being displayed on a second display and in response to a predetermined period of time elapsing after starting recording of the first image without the user performing the recording operation, with a third image displayed on the second display when it is determined that the information of interest is being displayed on the second display;
- wherein starting the recording of the second image and displaying the first image are performed simultaneously and in response to the recording operation, and
- wherein overwriting the recorded first image with the third image includes overwriting in memory the first image with the third image.

16. A display control apparatus in a display control system including a plurality of display control apparatuses, for controlling display of an image on a display associated with the display control apparatus from among a plurality of displays arranged in an array, the display control apparatus comprising:
- the display for displaying an image corresponding to an image signal input to the display control apparatus; and
- circuitry configured to
    - determine whether or not information of interest is being displayed on the display;
    - control recording of a first image displayed on the display when it is determined that the information of interest is being displayed on the display; and
    - stop, in response to the user performing a recording operation, recording of the first image and start recording of a second image displayed on the display when the user performed the recording operation;
    - overwrite the recorded first image, in response to a determination that information of interest is being displayed on the display and in response to a predetem lined period of time elapsing after starting recording of the first image without the user performing the recording operation, with a third image displayed on the display when it is determined that the information of interest is being displayed on the display;
- wherein starting the recording of the second image and displaying the first image are performed simultaneously and in response to the recording operation, and
- wherein overwriting the recorded first image with the third image includes overwriting in memory the first image with the third image.

* * * * *